(12) United States Patent
Iwato et al.

(10) Patent No.: US 7,839,476 B2
(45) Date of Patent: Nov. 23, 2010

(54) DISPLAY DEVICE

(75) Inventors: Hiroaki Iwato, Mobara (JP); Kotaro Araya, Hitachiota (JP); Kenji Terada, Chiba (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 771 days.

(21) Appl. No.: 11/752,326

(22) Filed: May 23, 2007

(65) Prior Publication Data
US 2007/0279564 A1 Dec. 6, 2007

(30) Foreign Application Priority Data
May 31, 2006 (JP) .............................. 2006-150773

(51) Int. Cl.
*G02F 1/1343* (2006.01)
(52) U.S. Cl. ....................... 349/141; 349/147
(58) Field of Classification Search ................ None
See application file for complete search history.

(56) References Cited

U.S. PATENT DOCUMENTS 6,350,557 B1 * 2/2002 Aomori et al. .............. 430/319
6,524,876 B1 2/2003 Baek et al.
6,825,893 B2 11/2004 Choi
7,199,853 B2 * 4/2007 Koide .......................... 349/147

FOREIGN PATENT DOCUMENTS

| CN | 1450385 | 10/2003 |
| JP | 3-211526 | 9/1991 |
| JP | 11-326949 | 11/1999 |

* cited by examiner

*Primary Examiner*—Tina M Wong
(74) *Attorney, Agent, or Firm*—Antonelli, Terry, Stout & Kraus, LLP.

(57) ABSTRACT

The present invention reduces a connection failure between two conductive layers which are connected with each other via a through hole in a display device and reduces a defect of an orientation film formed on a TFT substrate side in a liquid crystal display device. A display device includes a display panel in which a first conductive layer formed on a surface of a substrate, and a second conductive layer which is formed over the first conductive layer as viewed from a surface of the substrate by way of a thin film layer formed of one insulation film or two or more stacked thin films including one insulation film are electrically connected with each other in an opening portion formed in the thin film layer. Out of opening ends of the opening portion of the thin film layer, an outer periphery of the opening end remote from the surface of the substrate changes a distance from the surface of the substrate one time or more during one turn of the outer periphery.

13 Claims, 18 Drawing Sheets

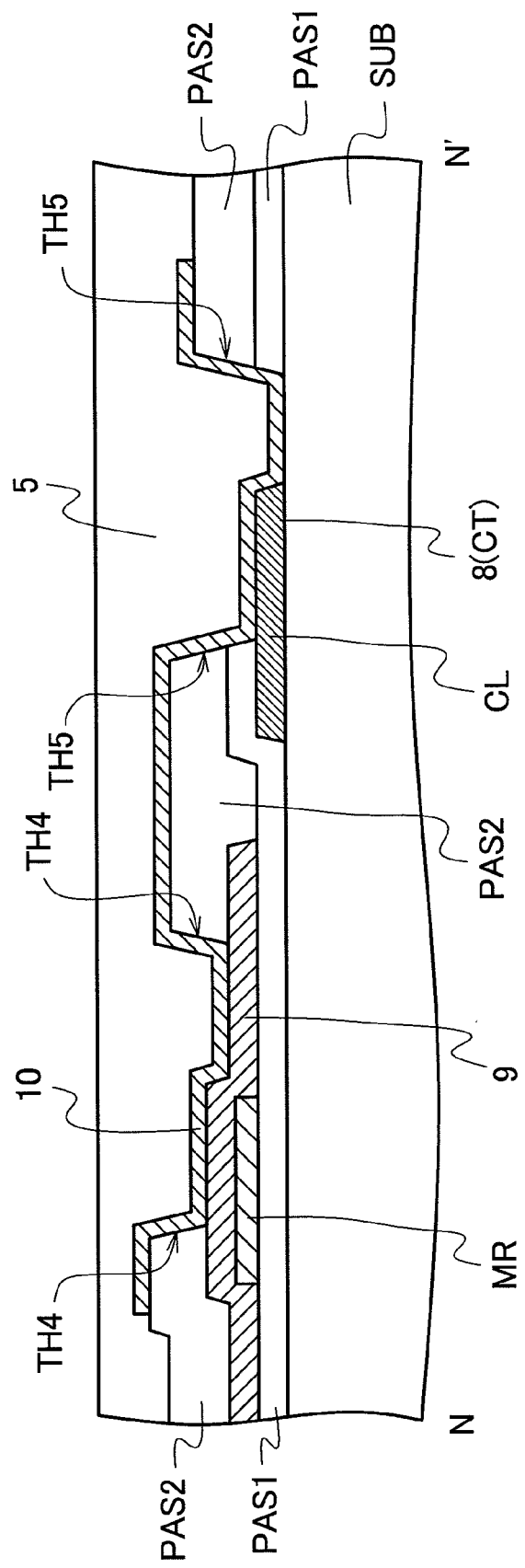

DISPLAY DEVICE

The present application claims priority from Japanese application JP2006-150773 filed on May 31, 2006, the content of which is hereby incorporated by reference into this application.

BACKGROUND OF THE INVENTION

1. Field of the Invention

The present invention relates to a display device, and more particularly to a technique which is effectively applicable to through holes formed in a display region of a liquid crystal display device.

2. Description of the Related Art

Conventionally, as a display device which displays a video or an image, there has been known a liquid crystal display device which uses a liquid crystal display panel sealing a liquid crystal material between a pair of substrates.

In the liquid crystal display panel, one substrate out of a pair of substrates is generally referred to as a TFT substrate, and on a surface of a transparent substrate, a plurality of scanning signal lines and a plurality of video signal lines which stereoscopically intersects the plurality of scanning signal lines by way of an insulation layer are formed. Then, a region which is surrounded by two neighboring scanning signal lines and two neighboring video signal lines corresponds to one pixel region, and a TFT element, a pixel electrode and the like are arranged on each pixel region. Further, another substrate which forms a pair with the TFT substrate is generally referred to as a counter substrate.

When the liquid crystal display panel is, for example, of a drive method which is referred to as a vertical-electric-field method such as a TN method or a VA method, a counter electrode (also referred to as a common electrode) which faces the pixel electrode of the TFT substrate is arranged on a counter substrate side. Further, in case of a drive method which is referred to as a lateral electric field method such as an IPS method, for example, the counter electrode is formed on the TFT substrate side.

Further, the pixel electrode of the TFT substrate is electrically connected with a source electrode of the TFT element. Here, a one-layered or two-layered insulation film is interposed between the source electrode and the pixel electrode, and the pixel electrode is connected with the source electrode at an opening portion referred to as a through hole or a contact hole formed in the insulation film (for example, see patent document 1 (JP-A-11-326949)).

The TFT substrate and the counter substrate form an orientation film for controlling the direction (orientation) of liquid crystal molecules in a state that no potential difference exists between the pixel electrode and the counter electrode and an arrangement and an inclination of the liquid crystal molecules when the potential difference is generated between the pixel electrode and the counter electrode. The orientation film is formed on an interface with a liquid crystal material (a liquid crystal layer) of each substrate and, for example, is formed by applying rubbing treatment to a surface of a resin film made of polyimide which is formed to cover the whole display region constituted of a mass of the pixel regions.

Here, the pixel electrodes of the TFT substrate are formed by forming a transparent conductive film made of ITO on a whole surface of an insulation layer in which through holes (opening portions) are formed and, thereafter, by etching the conductive film. Here, an etching resist used in etching the conductive film is formed by applying a resist material in a liquid form on the conductive film by printing or coating and, thereafter, by exposing and developing the resist material.

However, in the liquid crystal display device of recent years, for example, along with the fining of the pixel region and the increase of a numerical aperture of the pixel region, a hole diameter of a through hole (opening portion) is decreased. Accordingly, for example, when the resist material in a liquid form is applied by printing or coating, the resist material in a liquid form hardly enters a recessed portion formed in a through hole portion. Accordingly, a defect is formed in the through hole portion of the etching resist which is formed by exposure and development and hence, the conductive film (ITO film) of the through hole portion is removed by etching performed subsequently. As a result, for example, there arises a drawback that a conductive failure is generated between the source electrode and the pixel electrode of the TFT substrate.

Further, in case of the TFT substrate, in forming the orientation film, the resin material in a liquid form is applied to the pixel electrode by printing or coating and, thereafter, the resin material is hardened (cured) by baking. Also in this case, for example, when the hole diameter of the through hole (opening portion) for connecting the pixel electrode with the source electrode is small, the printed resin material in a liquid form hardly enters the recessed portion formed in the through hole portion. Accordingly, there have been drawbacks that fine recessed defects are generated in the orientation film on the TFT substrate side, the orientation irregularities occur in the through hole portion, and leaking of light occurs.

SUMMARY OF THE INVENTION

Accordingly, it is an object of the present invention to provide a technique which can reduce a connection failure between two conductive layers which are connected with each other via a through hole in a display device.

It is another object of the present invention to provide, for example, a technique which is capable of reducing a connection failure between a source electrode of a TFT element and a pixel electrode which are connected with each other via a through hole in a liquid crystal display device.

It is another object of the present invention to provide, for example, a technique which can reduce a defect of an orientation film formed on a TFT substrate side in the liquid crystal display device.

The above-mentioned and other objects and novel features of the present invention will become apparent from the description of this specification and attached drawings.

To schematically explain the summary of typical inventions among inventions disclosed in this specification, they are as follows.

A display device of the present invention includes a pair of substrates which is formed of a transparent member, a first conductive layer which is formed on one of the substrates, a second conductive layer which is formed on a liquid crystal side of the first conductive layer by way of an intermediate layer which includes at least one insulation layer, and an opening portion formed in the intermediate layer, wherein out of opening ends of the opening portion, an outer periphery of the opening end on the liquid crystal side has a distance thereof from the substrate changed one time or more during one turn of the outer periphery.

Further, a display device of the present invention includes a pair of substrates which is formed of a transparent member, a first conductive layer which is formed on one of the substrates, a second conductive layer which is formed on a liquid crystal side of the first conductive layer by way of an intermediate layer which includes at least one insulation layer, and an opening portion formed in the intermediate layer such that the second conductive layer is exposed, wherein the first conductive layer is formed to cover the opening portion, and an opening end of the opening portion is formed such that a distance between the opening end on another substrate side and the substrate is set at least in two modes.

In the display device of the present invention, due to the characterizing constitution thereof, for example, in forming the second conductive layer by etching, the resist material in a liquid form which is applied to the conductive film by printing or coating easily enters a recessed portion formed in the opening portion thus preventing a shape defect of an etching resist. Accordingly, it is possible to prevent a conductive failure between the first conductive film and the second conductive film in the opening portion.

To change the distance between the outer periphery of the opening end and the surface of the substrate, for example, the opening portion may be formed such that the outer periphery of the opening end on another substrate side passes through two or more regions which differ in the number of layers of thin films which are interposed between the surface of the substrate and the second conductive layer.

Here, in the display device of the present invention, provided that the liquid crystal display panel includes the substrate which forms the first conductive layer and the second conductive layer which are connected with each other via the through hole on a surface thereof, any liquid crystal display panel may be used. Particularly, it is desirable to adopt the liquid crystal display panel which seals a liquid crystal material between a pair of substrates.

The substrate of the liquid crystal display panel forms an orientation film on an interface thereof with the liquid crystal material (liquid crystal layer) and the orientation film is formed by applying a resin material in a liquid form to a surface of the substrate in which a recessed portion is formed by the opening portion (through hole) by printing or coating. Accordingly, by changing a distance between an outer periphery of the opening end remoter from the surface of the substrate in distance and the surface of the substrate, for example, the printed resin material in a liquid form can easily enter the recessed portion formed in the opening portion thus preventing a shape defect of the orientation film.

Further, in the liquid crystal display panel or the like, the substrate which mounts the first conductive layer and the second conductive layer thereon includes, on the surface thereof, a plurality of scanning signal lines, a plurality of video signal lines which stereoscopically intersects the plurality of scanning signal lines by way of an insulation layer, and a TFT element and a pixel electrode which are arranged in each region surrounded by two neighboring scanning signal lines and two neighboring video signal lines. Here, the first conductive layer is a source electrode of the TFT element and the second conductive layer is the pixel electrode.

Further, in the liquid crystal display panel, the substrate which mounts the first conductive layer and the second conductive layer thereon may include, on the surface thereof, a plurality of scanning signal lines, a plurality of video signal lines which stereoscopically intersect the plurality of scanning signal lines by way of the insulation layer, and a TFT element and a pixel electrode which are arranged in each region surrounded by two neighboring scanning signal lines and two neighboring video signal lines, common electrodes which are overlapped with the pixel electrodes in plane between the surface of the first substrate and the pixel electrodes, and a bridge line which stereoscopically intersects one scanning signal line by way of an insulation layer and electrically connects two common electrodes which are arranged with one scanning signal line sandwiched therebetween. In this case, the number of combinations of the first conductive layer and the second conductive layer is two. In one combination, the first conductive layer is formed of a source electrode of the TFT element and the second conductive layer is formed of the pixel electrode. In another combination, the first conductive layer is formed of the common electrode or a conductive layer which is brought into contact with and is electrically connected with the common electrode, and the second conductive layer is the bridge line.

Further, in the display panel such as a liquid crystal display panel, for example, the TFT element adopts various constitutions (structures). Besides the above-mentioned combination of the source electrode and the pixel electrode and the combination of the common electrode and the bridge line, other conductive layers may be connected via the opening portion (through hole). Also in such a case, by providing the above-mentioned constitution to the opening portion, when a material in a liquid form is applied to the second conductive layer by printing or coating, the printed material in a liquid form can easily enter the recessed portion formed in the opening portion.

BRIEF DESCRIPTION OF THE DRAWINGS

FIG. 32 is a schematic cross-section al view for explaining a modification of the through hole in the embodiment 5.

DESCRIPTION OF THE PREFERRED EMBODIMENT

Herein after, the present invention is explained in detail in conjunction with embodiments by reference to the drawings. Here, in all drawings for explaining the embodiments, parts having identical functions are given same symbols and their repeated explanation is omitted.

FIG. 1 to FIG. 5 are schematic views showing one constitution al example of a display panel to which the present invention is applied.

Figure 1:
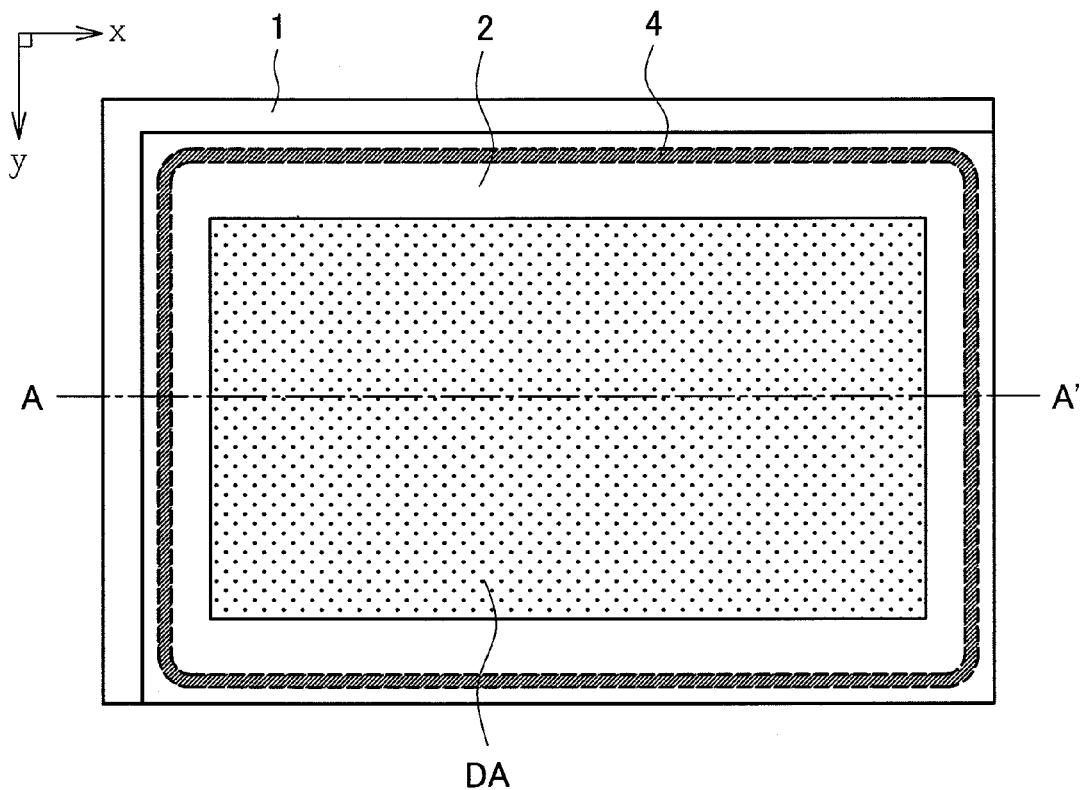
FIG. 1 is a schematic plan view of a liquid crystal display panel as viewed from a viewer's side.
Figure 2:
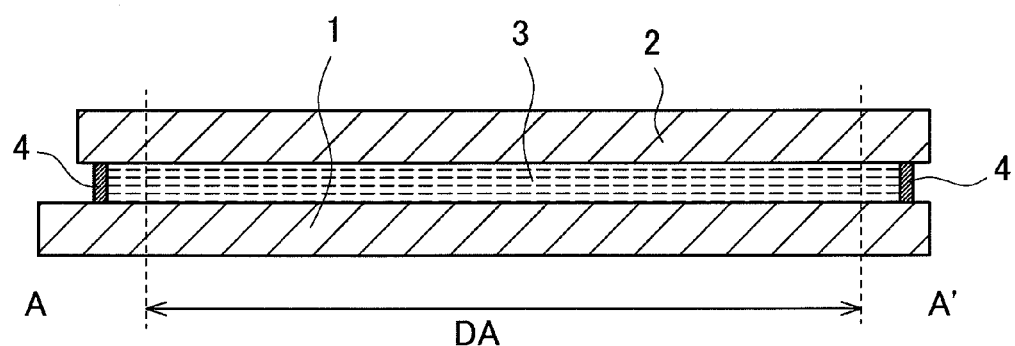
FIG. 2 is a schematic cross-section al view taken along a line A-A' in FIG. 1.
Figure 3:
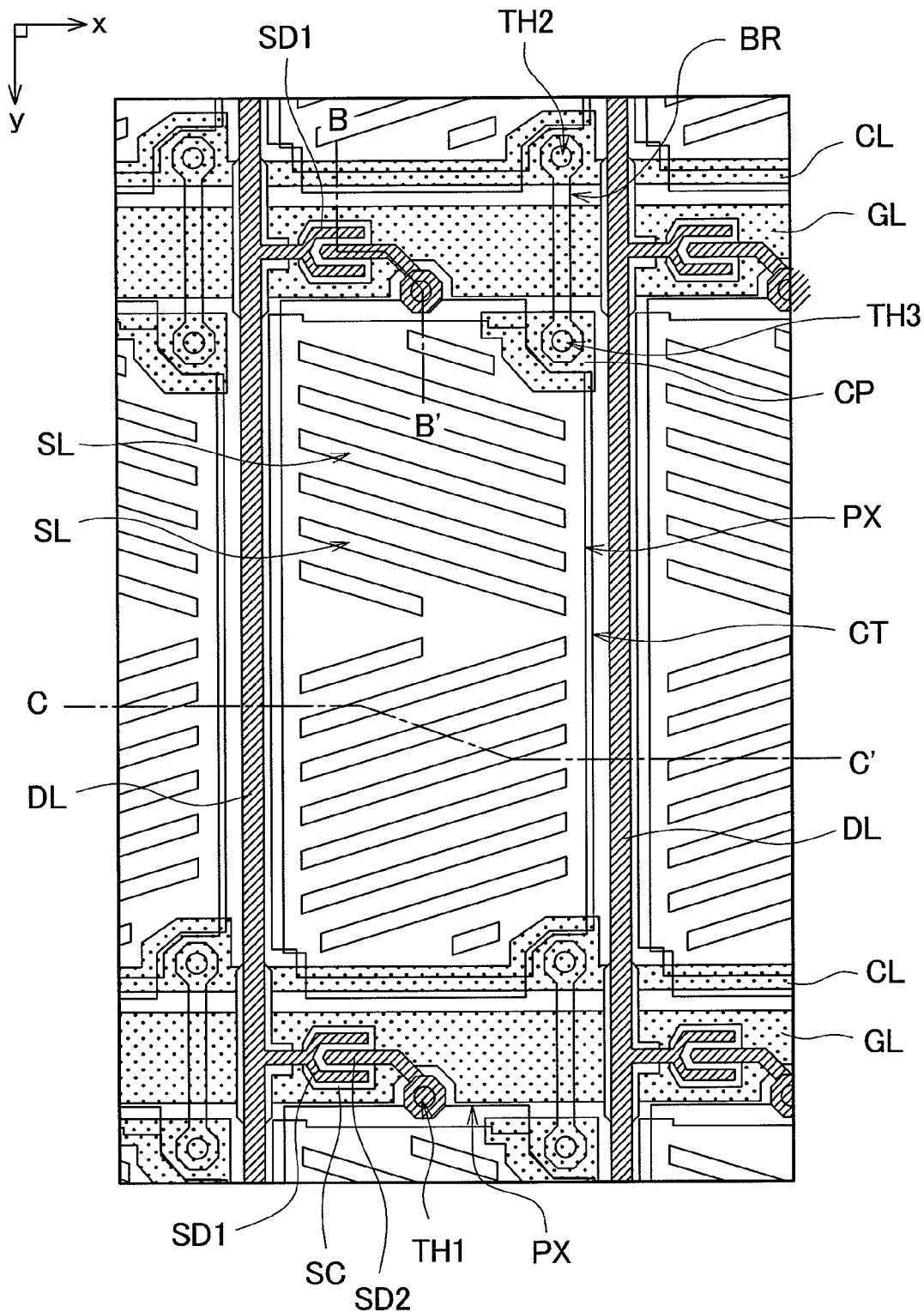
FIG. 3 is a schematic plan view showing a constitution al example of one pixel in a display region of a TFT substrate of the liquid crystal display panel.
Figure 4:
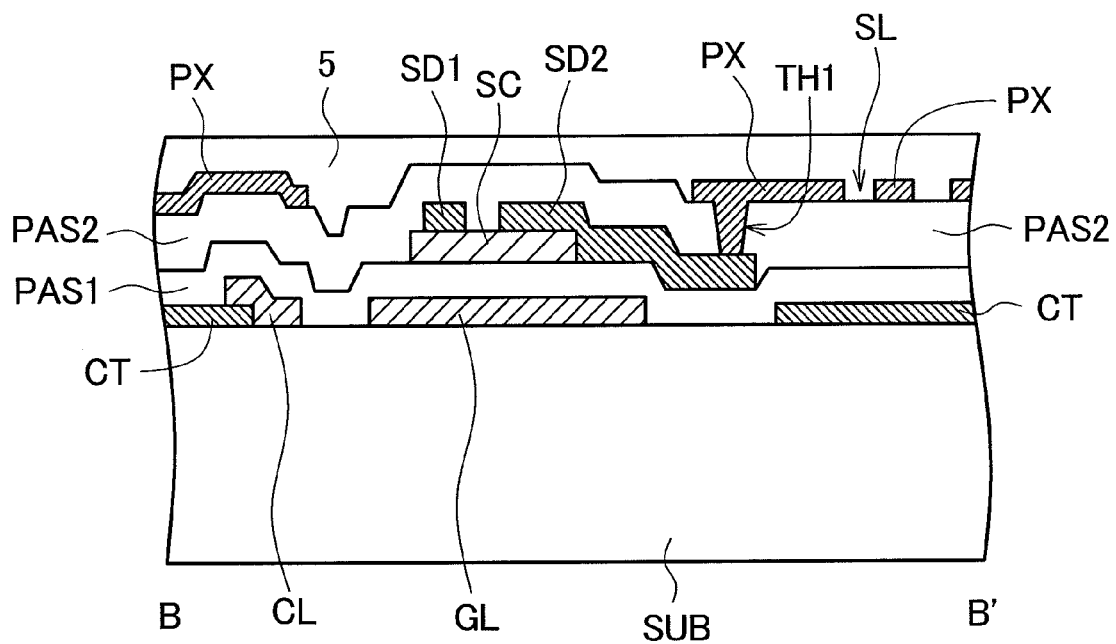
FIG. 4 is a schematic cross-section al view taken along a line B-B' in FIG. 3.
Figure 5:
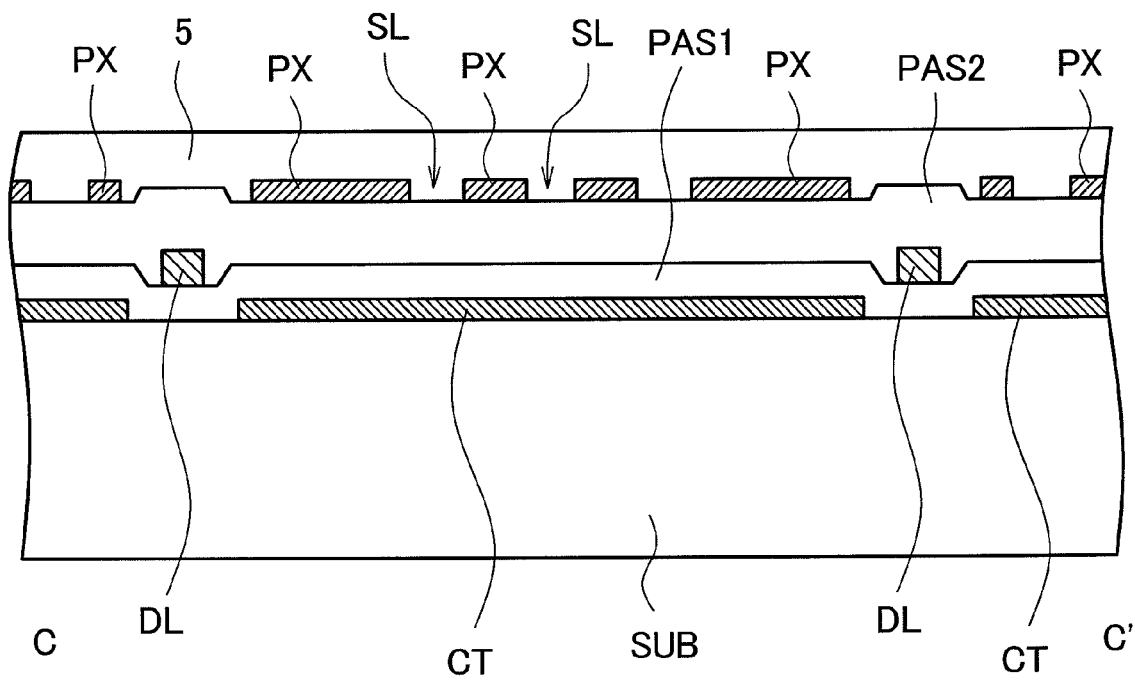
FIG. 5 is a schematic cross-section al view taken along a line C-C' in FIG. 3.

FIG. 1 is a schematic plan view of a liquid crystal display panel as viewed from a viewer's side. FIG. 2 is a schematic cross-section al view taken along a line A-A' in FIG. 1. FIG. 3 is a schematic plan view showing a constitution al example of one pixel in a display region of a TFT substrate of the liquid crystal display panel. FIG. 4 is a schematic cross-section al view taken along a line B-B' in FIG. 3. FIG. 5 is a schematic cross-section al view taken along a line C-C' in FIG. 3.

The present invention relates to a display device which includes a display panel, wherein the display panel mounts two conductive layers which are connected to each other by way of a through hole on a surface of a substrate. As an example of such a display panel, a liquid crystal display panel is named.

The liquid crystal display panel is, as shown in FIG. 1 and FIG. 2, a display panel which seals a liquid crystal material 3 between a pair of substrates 1, 2. Here, the pair of substrates 1, 2 is adhered to each other using a sealing material 4 which is arranged outside a display region DA in an annular shape, and the liquid crystal material 3 is sealed in a space surrounded by the pair of substrates 1, 2 and the sealing material 4.

Out of the pair of substrates 1, 2, generally, the substrate 1 having an external size thereof larger than an external size of the substrate 2 as viewed from a viewer's side is referred to as a TFT substrate. Although the explanation is omitted in FIG. 1 and FIG. 2, the TFT substrate 1 is configured such that a plurality of scanning signal lines and a plurality of video signal lines which stereoscopically intersect the plurality of scanning signal lines by way of an insulation layer are formed on a surface of a transparent substrate such as a glass substrate. Further, a region which is surrounded by two neighboring scanning signal lines and two neighboring video signal lines corresponds to one pixel region, and a TFT element, a pixel electrode and the like are arranged on each pixel region. Further, another substrate 2 which forms a pair with the TFT substrate 1 is generally referred to as a counter substrate.

When the liquid crystal display panel is, for example, of a drive method referred to as a vertical-electric-field method such as a TN method or a VA method, a counter electrode (also referred to as a common electrode) which faces the pixel electrode of the TFT substrate 1 is arranged on a counter substrate 2 side. Further, in case of a drive method which is referred to as a lateral electric field method such as an IPS method, for example, the counter electrode is formed on the TFT substrate 1 side.

Next, a constitution al example of one pixel of a display region DA of the liquid crystal display panel is briefly explained in conjunction with FIG. 3 to FIG. 5.

In the liquid crystal display panel to which the present invention is applied, one pixel of the display region DA may adopt any constitution provided that two conductive layers such as a source electrode of the TFT element and the pixel electrode, for example, are connected with each other via a through hole. However, in the embodiment described herein after, the constitution which adopts the IPS method shown in FIG. 3 to FIG. 5 is exemplified.

In the IPS-method liquid crystal display panel, the pixel electrodes and the counter electrodes (common electrodes) are provided on a TFT substrate 1 side. Here, the TFT substrate 1 is configured such that, for example, as shown in FIG. 3 to FIG. 5, a plurality of scanning signal lines GL which extend in the x direction are mounted on a surface of a glass substrate SUB, and a plurality of video signal lines DL which extend in the y direction by way of a first insulation layer PAS1 and stereoscopically intersect the plurality of scanning signal lines GL are formed on the scanning signal lines GL. Further, a region which is surrounded by two neighboring scanning signal lines GL and two neighboring video signal lines DL corresponds to one pixel region.

Further, on the surface of the glass substrate SUB, for example, a planar counter electrode CT is formed for every pixel region. Here, the counter electrodes CT in the respective pixel regions which are arranged in the x direction are electrically connected with each other by a common signal line CL which is arranged parallel to the scanning signal line GL. Further, on a side opposite to the direction along which the common signal line CL is formed as viewed from the scanning signal line GL, a common connection pad CP which is electrically connected with the counter electrode CT is provided.

Further, on a first insulation layer PAS1, besides the video signal lines DL, semiconductor layers, drain electrodes SD1, and source electrodes SD2 are formed. Here, the semiconductor layers are formed using amorphous silicon (a-Si), for example. The semiconductor layers are constituted of semiconductor layers which have a function of a channel layer SC of the TFT element which is arranged in each pixel region and the semiconductor layers (not shown in the drawing) which prevent short-circuiting of the scanning signal line GL and the video signal line DL in a region where the scanning signal line GL and the video signal line DL stereoscopically intersect each other, for example. Here, to the semiconductor layer having the function of the channel layer SC of the TFT element, both of the drain electrode SD1 and the source electrode SD2 which are connected with the video signal line DL are connected.

Further, on a surface (layer) on which the video signal lines DL and the like are formed, the pixel electrodes PX are formed by way of a second insulation layer PAS2. The pixel electrode PX is an electrode which is formed independently for every pixel region and is electrically connected with the source electrode SD2 at an opening portion (through hole) TH1 which is formed in the second insulation layer PAS2. Further, when the counter electrode CT and the pixel electrode PX are, as shown in FIG. 3 to FIG. 5, arranged in a stacked manner by way of the first insulation layer PAS1 and the second insulation layer PAS2, the pixel electrode PX is formed of a comb-teeth-shaped electrode in which slits SL are formed.

Further, on the second insulation layer PAS2, besides the pixel electrode PX, for example, bridge lines BR for electrically connecting two counter electrodes CT which are arranged vertically with the scanning signal line GL sandwiched therebetween are provided. Here, the bridge line BR is connected with the common signal line CL and the common connection pad CP which are arranged with the scanning signal line GL sandwiched therebetween via through holes TH2, TH3.

Further, on the second insulation layer PAS2, an orientation film 5 is formed such that the orientation film covers the pixel electrodes PX and the bridge lines BR. Here, although not shown in the drawing, the counter substrate 2 is arranged to face a surface of the TFT substrate 1 on which the orientation film 5 is formed.

Herein after, shapes of the through holes when one pixel has the constitution shown in FIG. 3 to FIG. 5 are explained.

Embodiment 1

Figure 6:
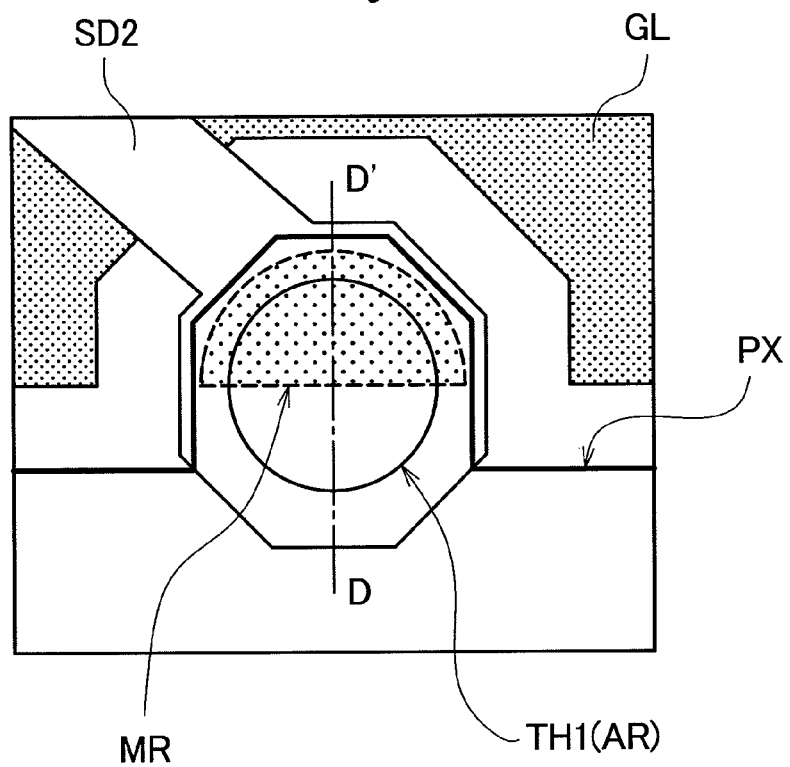
FIG. 6 is a schematic plan view showing the schematic constitution of a through hole of an embodiment 1.
Figure 7:
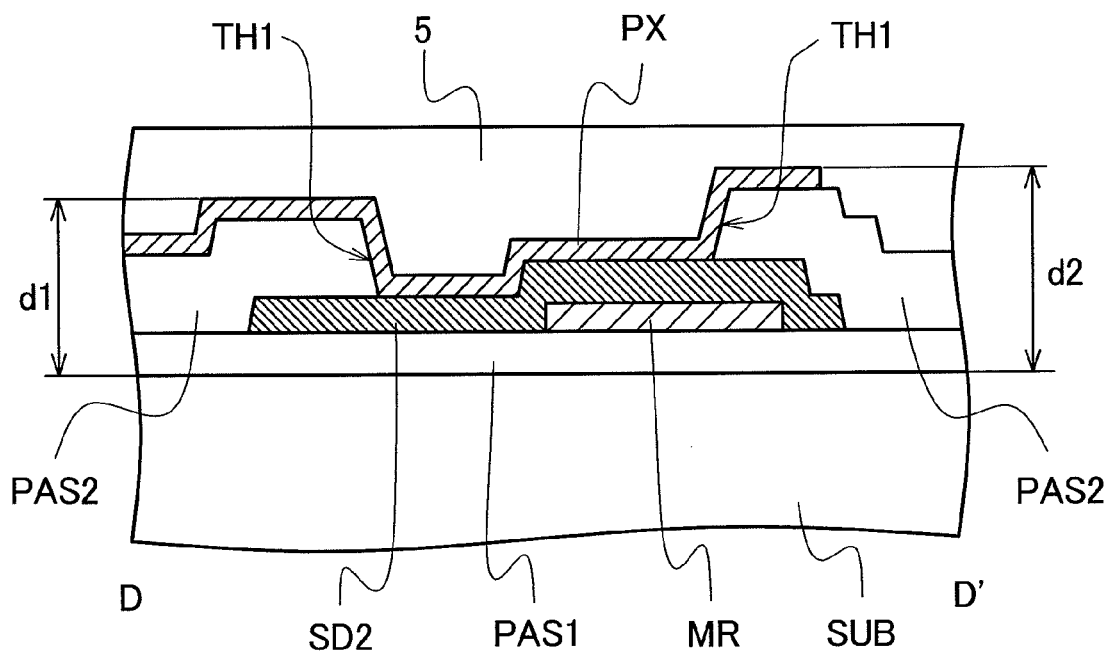
FIG. 7 is a schematic cross-section al view taken along a line D-D' in FIG. 6.

FIG. 6 and FIG. 7 are schematic views showing the schematic constitution of an essential part of the liquid crystal display panel of the embodiment 1 according to the present invention.

FIG. 6 is a schematic plan view showing the schematic constitution of the through hole of the embodiment 1, and FIG. 7 is a schematic cross-section al view taken along a line D-D' in FIG. 6.

This embodiment 1 focuses on the through hole which connects the source electrode of the TFT element and the pixel electrode and the constitution al example to which the present invention is applied and the manner of operation and advantageous effects of the constitution al example are explained.

When one pixel of the display region DA adopts the constitution shown in FIG. 3 to FIG. 5, by applying the present invention to the connection portion between the source electrode SD2 of the TFT element and the pixel electrode PX, it is possible to achieve the constitution shown in FIG. 6 and FIG. 7, for example. Here, in a region where the source electrode SD2 and the pixel electrode PX are overlapped with each other in plane, a stepped-portion forming layer MR is partially formed between the source electrode SD2 and the first insulation layer PAS1. In the embodiment 1, the stepped-portion forming layer MR is formed simultaneously in a step in which the semiconductor layer such as the channel layer SC of the TFT element is formed. Further, the stepped-portion forming layer MR is, for example, formed in a semicircular profile as viewed in plane.

Here, the opening portion (through hole) TH1 formed in the second insulation layer PAS2 is formed such that an outer periphery AR of an opening end remote from the glass substrate SUB passes a region where the stepped-portion forming layer MR is formed and a region where the stepped-portion forming layer MR is not formed. Accordingly, the outer periphery AR of the opening end of the opening portion TH1 remote from the glass substrate SUB is configured such that a region where a distance from a surface of the glass substrate SUB is d1 and a region where a distance from a surface of the glass substrate SUB is d2 exist during one turn of the outer periphery. Here, the outer periphery AR of the opening end of the opening portion TH1 remote from the glass substrate SUB changes the distance from the surface of the glass substrate SUB from d1 to d2 at an intersecting point thereof with an outer periphery of the stepped-portion forming layer MR. The manner of operation and advantageous effects attributed to the through hole TH1 having such a shape are explained in conjunction with FIG. 8 to FIG. 10.

Figure 8:
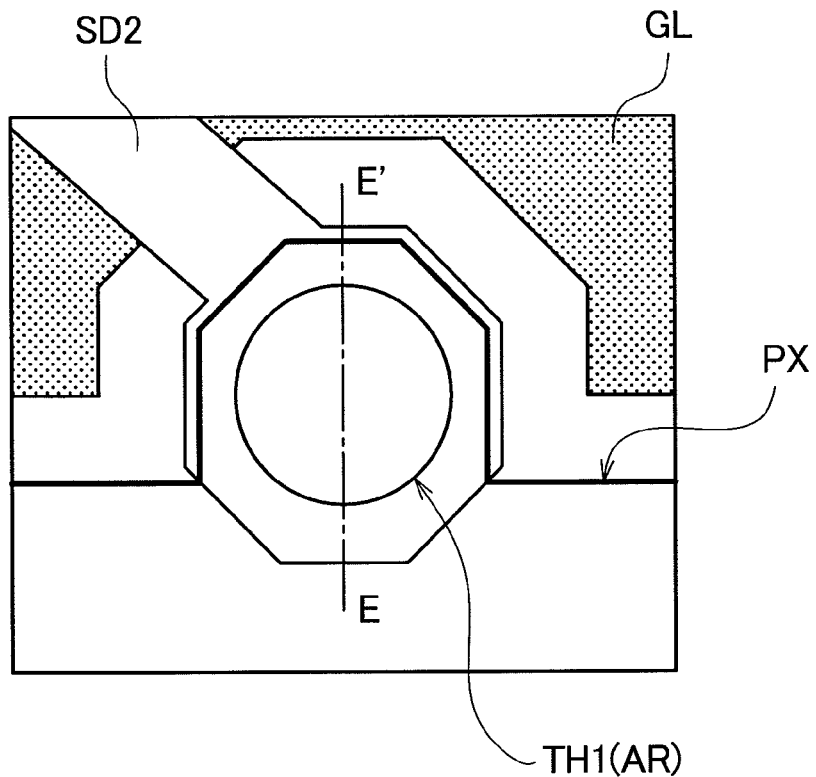
FIG. 8 is a schematic plan view showing the schematic constitution of a through hole in a convention al TFT substrate.
Figure 9:
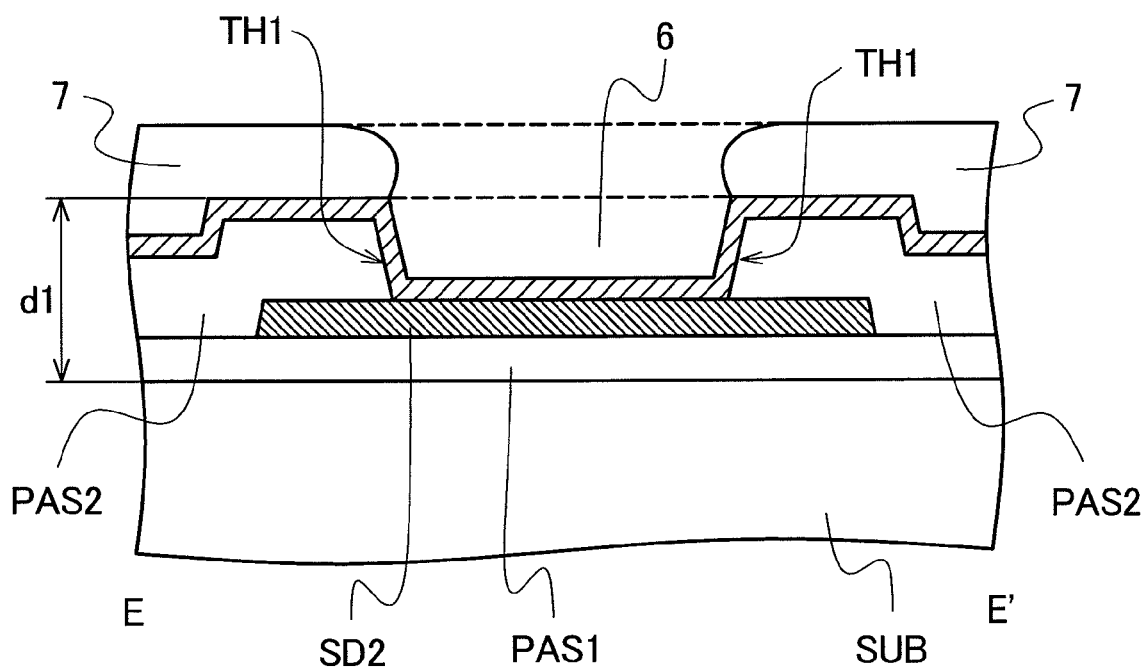
FIG. 9 is a schematic cross-section al view for explaining a point which becomes a drawback in the convention al TFT substrate.
Figure 10:
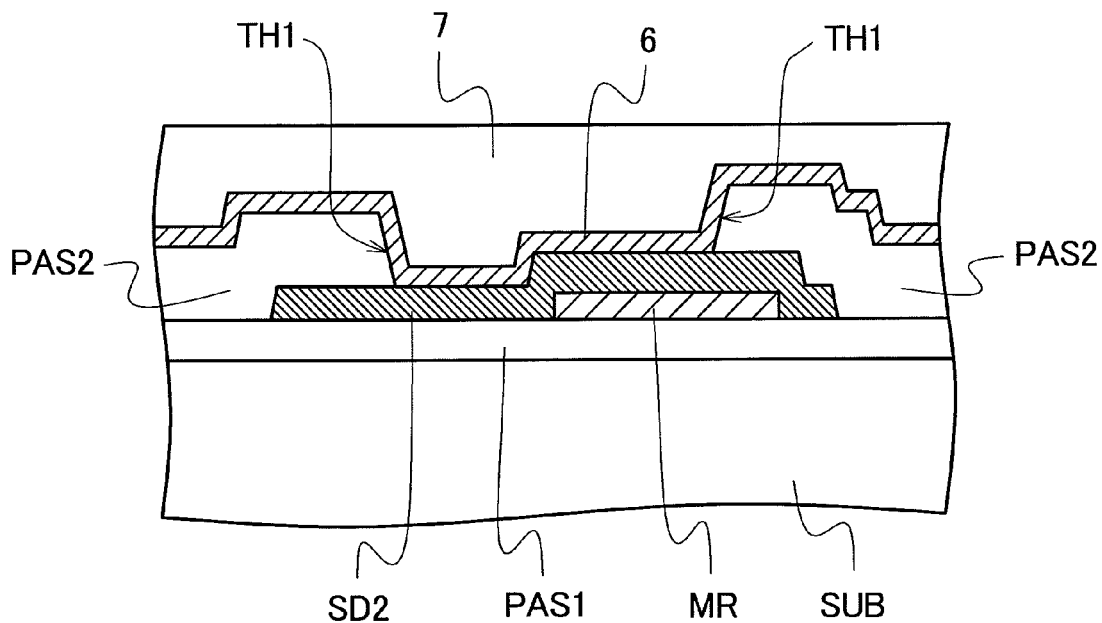
FIG. 10 is a schematic cross-section al view for explaining the manner of operation and advantageous effects of the through hole in the embodiment 1.

FIG. 8 is a schematic plan view showing the schematic constitution of a through hole in a convention al TFT substrate. FIG. 9 is a schematic cross-section al view for explaining a point which becomes a drawback in the convention al TFT substrate. FIG. 10 is a schematic cross-section al view for explaining the manner of operation and advantageous effects of the through hole in the embodiment 1. Here, FIG. 9 is a cross-sectional view corresponding to a cross section taken along a line E-E' in FIG. 8, and FIG. 10 is a cross-section al view corresponding to a cross section taken along a line D-D' in FIG. 6.

In the convention al TFT substrate, a connecting portion of a source electrode SD2 of a TFT element and a pixel electrode PX is configured as shown in FIG. 8 and FIG. 9, for example, wherein the source electrode SD2 has a region thereof where the pixel electrode PX is overlapped with the source electrode SD2 in plane arranged substantially parallel to a surface of the glass substrate SUB. That is, in the convention al TFT substrate, with respect to an outer periphery AR of an opening end of an opening portion (through hole) TH1 formed in the second insulation layer PAS2 remote from a glass substrate SUB, a distance from a surface of the glass substrate SUB is set to an approximately fixed value d1 at any point on the outer periphery AR.

Accordingly, for example, in a step for forming the pixel electrode PX, when a resist material 7 in a liquid form which is used for forming an etching resist is applied by printing or coating to a transparent conductive film 6 made of ITO for forming the pixel electrode PX, for example, as shown in FIG. 9, there exists a case in which the resist material 7 in a liquid form does not enter a recessed portion formed by the through hole TH1. When the etching resist is formed by performing development and exposure in a state that the resist material 7 does not enter the recessed portion formed by the through hole TH1, the recessed portion which is to be covered with the etching resist in an origin al state exhibits an exposed state. Accordingly, when the conductive film 6 is etched, a portion of the conductive film 6 extending to the recessed portion is removed thus giving rise to a drawback that a conductive failure occurs between the source electrode SD2 and the pixel electrode PX.

On the other hand, in the TFT substrate 1 of the embodiment 1, when the resist material 7 in a liquid form for forming the etching resist is applied by printing or coating to the transparent conductive film 6 made of ITO for forming the pixel electrode PX, out of the outer periphery AR of the opening end of the opening portion (through hole) TH1 formed in the second insulation layer PAS2 remote from the glass substrate SUB, at the portion where the distance from the surface of the glass substrate SUB changes from d1 to d2, the resist material 7 in a liquid form can easily enter the recessed portion formed by the through hole TH1. Accordingly, as shown in FIG. 10, the etching resist can be formed by development and exposure in a state that the resist material 7 is filled in the recessed portion formed by the through hole TH1 and hence, a conductive failure between the source electrode SD2 and the pixel electrode PX can be prevented.

Although the explanation using drawings is omitted, in manufacturing the TFT substrate 1, also when the orientation film 5 is formed after forming the pixel electrode PX, a resin material in a liquid form is applied by printing or coating. Also in this case, when the through hole TH1 has a shape shown in FIG. 8 and FIG. 9, the printed resin material in a liquid form hardly enters a recessed portion formed in a through hole portion thus giving rise to a case in which a defect is generated in the orientation film 5. On the other hand, by forming the orientation film 5 as in the case of the TFT substrate 1 of the embodiment 1, in the same manner as the above-mentioned resist material in a liquid form, out of an outer periphery AR of the through hole TH1 formed in the second insulation layer PAS2 remote from the glass substrate SUB, at a portion where a distance from the surface of the glass substrate SUB changes from d1 to d2, the resin material in a liquid form can easily enter the recessed portion formed in the through hole portion. Accordingly, it is possible to prevent the occurrence of a defect in the orientation film 5.

Here, in explaining the technical feature of the TFT substrate 1 of the embodiment 1, in an example shown in FIG. 6, between the source electrode SD2 and the first insulation layer PAS1, the stepped-portion forming layer MR having the semicircular profile in a plan view is provided. However, the profile of the stepped-portion forming layer MR in a plan view is not limited to such a profile and, it is needless to say that the stepped-portion forming layer MR may have other shapes.

The TFT substrate 1 of the embodiment 1 provides the portion where the distance from the surface of the glass substrate SUB changes from d1 to d2 during one turn of the outer periphery AR of the opening end of the opening portion (through hole) TH1 formed on the second insulation layer PAS2 remote from the glass substrate SUB and hence, the printed or coated resist material in a liquid form can easily enter the recessed portion formed in the through hole portion.

That is, an essential point in the TFT substrate 1 of the embodiment 1 lies in that the outer periphery AR of the opening end of the opening portion (through hole) TH1 formed on the second insulation layer PAS2 remote from the glass substrate SUB includes the portion where the distance from the surface of the glass substrate SUB changes from d1 to d2 during one turn of the outer periphery AR. Provided that this condition is satisfied, the profile of the stepped-portion forming layer MR in a plan view may have any shape.

Figure 11:
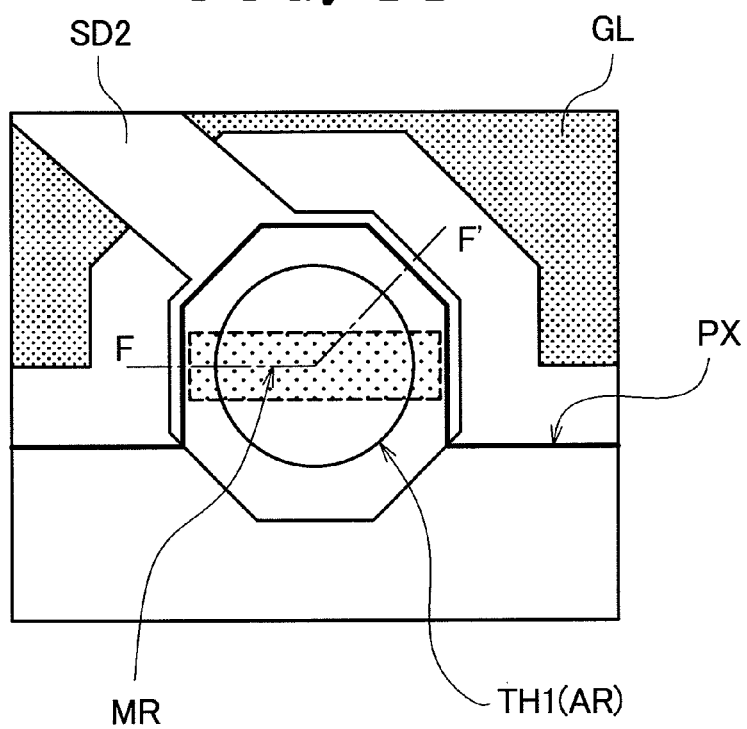
FIG. 11 is a schematic plan view for explaining a first modification of the through hole in the embodiment 1.
Figure 12:
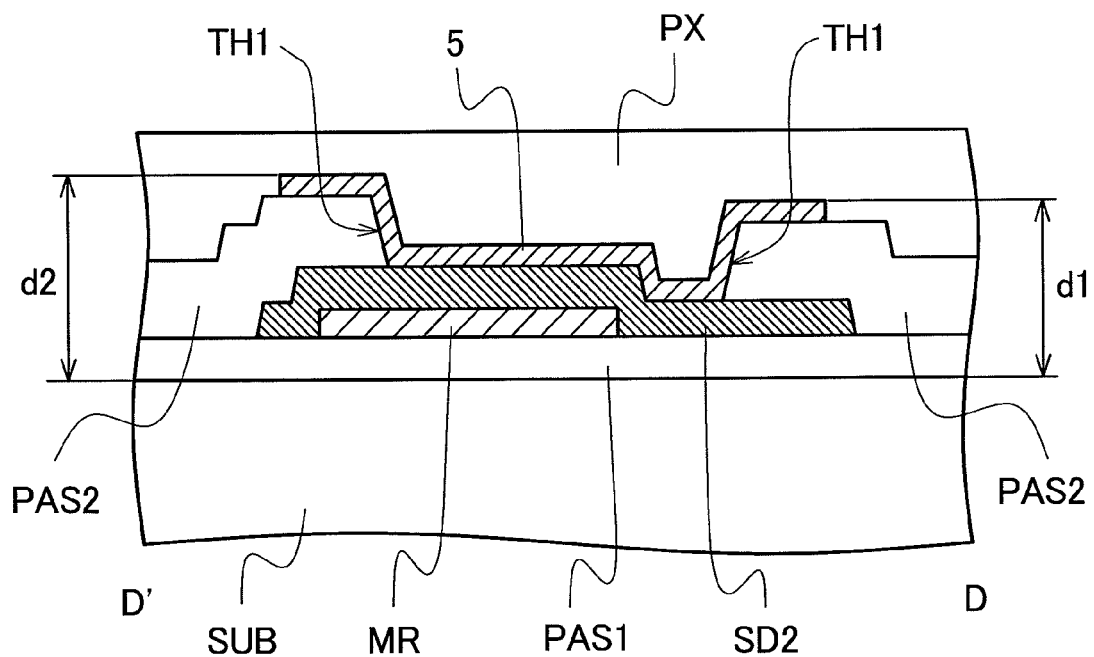
FIG. 12 is a schematic cross-section al view taken along a line F-F' in FIG. 11.

FIG. 11 is a schematic plan view for explaining a first modification of the through hole of the embodiment 1. FIG. 12 is a schematic cross-section al view taken along a line F-F' in FIG. 11.

In forming the portion where the distance from the surface of the glass substrate SUB changes from d1 to d2 on the outer periphery AR of the opening end of through hole TH1 formed in the second insulation layer PAS2 remote from the glass substrate SUB, for example, as shown in FIG. 11, a rod-like stepped-portion forming layer MR which is elongated in one direction may be provided. Also in this case, by allowing the outer periphery AR of the opening end of the through hole TH1 formed in the second insulation layer PAS2 remote from the glass substrate SUB to pass through a region where the stepped-portion forming layer MR is interposed and a region where the stepped-portion forming layer MR is not interposed, as shown in FIG. 12, on the outer periphery AR of the opening end of the through hole TH1 formed in the second insulation layer PAS2 remote from the glass substrate SUB, a region in which the distance from the surface of the glass substrate SUB is d1 and a region in which the distance from the surface of the glass substrate SUB is d2 exist. Accordingly, in the same manner as the example shown in FIG. 6 and FIG. 7, a resist material or a resin material in a liquid form can easily enter the recessed portion formed in the through hole portion.

Figure 13:
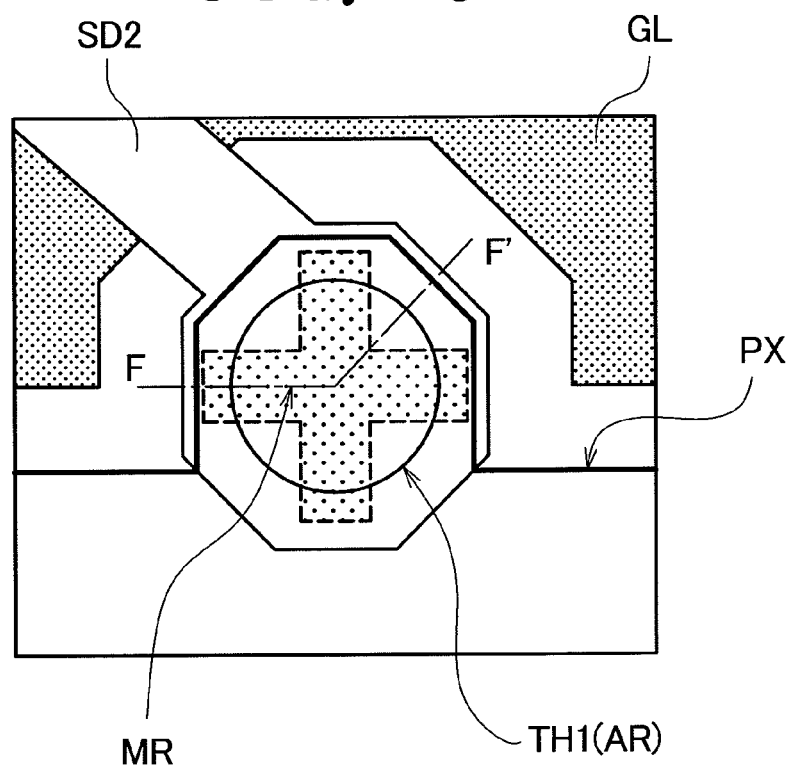
FIG. 13 is a schematic plan view for explaining a second modification of the through hole in the embodiment 1.

FIG. 13 is a schematic plan view for explaining a second modification of the through hole in the embodiment 1.

In forming the portion where the distance from the surface of the glass substrate SUB changes from d1 to d2 on the outer periphery AR of the opening end of through hole TH1 formed in the second insulation layer PAS2 remote from the glass substrate SUB, for example, a cruciform stepped-portion forming layer MR shown in FIG. 13 may be provided. Also in this case, by allowing the outer periphery AR of the opening end of the through hole TH1 formed in the second insulation layer PAS2 remote from the glass substrate SUB to pass through a region where the stepped-portion forming layer MR is interposed and a region where the stepped-portion forming layer MR is not interposed, the cross-section al structure taken along a line F-F' in FIG. 13 is configured as shown in FIG. 12. Accordingly, in the same manner as the example shown in FIG. 6 and FIG. 7, a resist material or a resin material in a liquid form can easily enter the recessed portion formed in the through hole portion.

Figure 14:
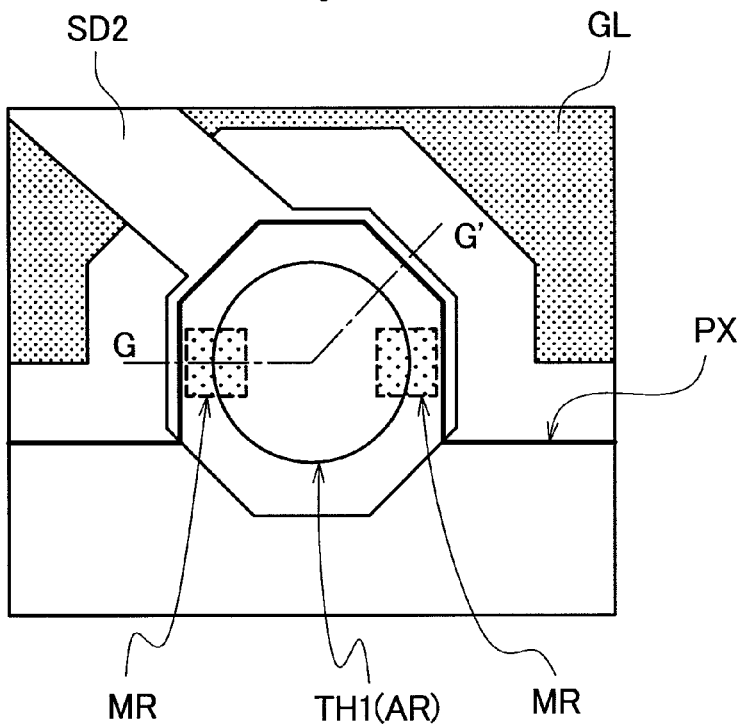
FIG. 14 is a schematic plan view for explaining a third modification of the through hole in the embodiment 1.
Figure 15:
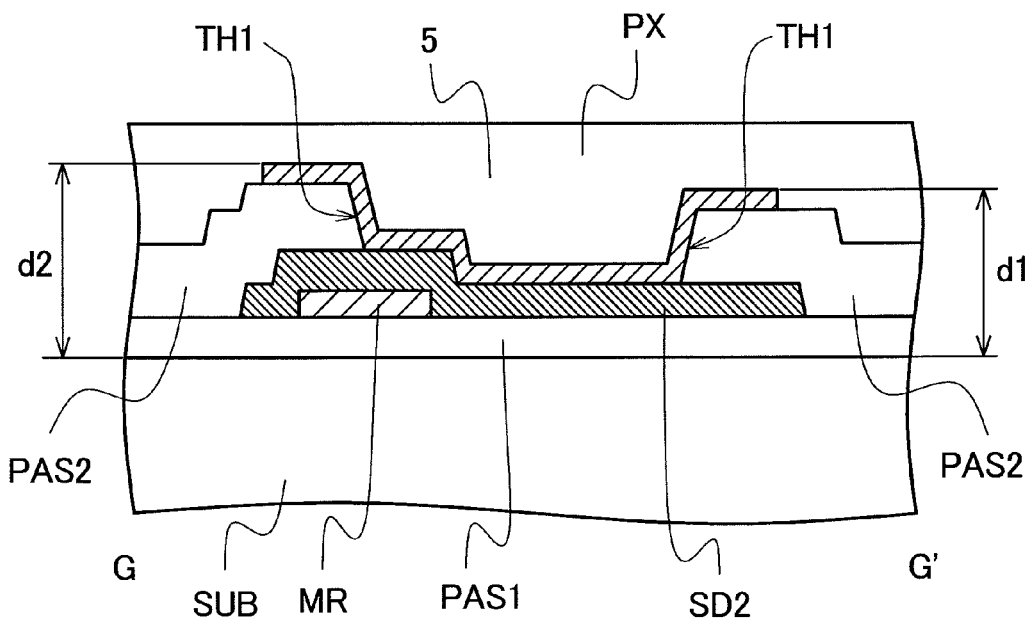
FIG. 15 is a schematic cross-section al view taken along a line G-G' in FIG. 14.
Figure 16:
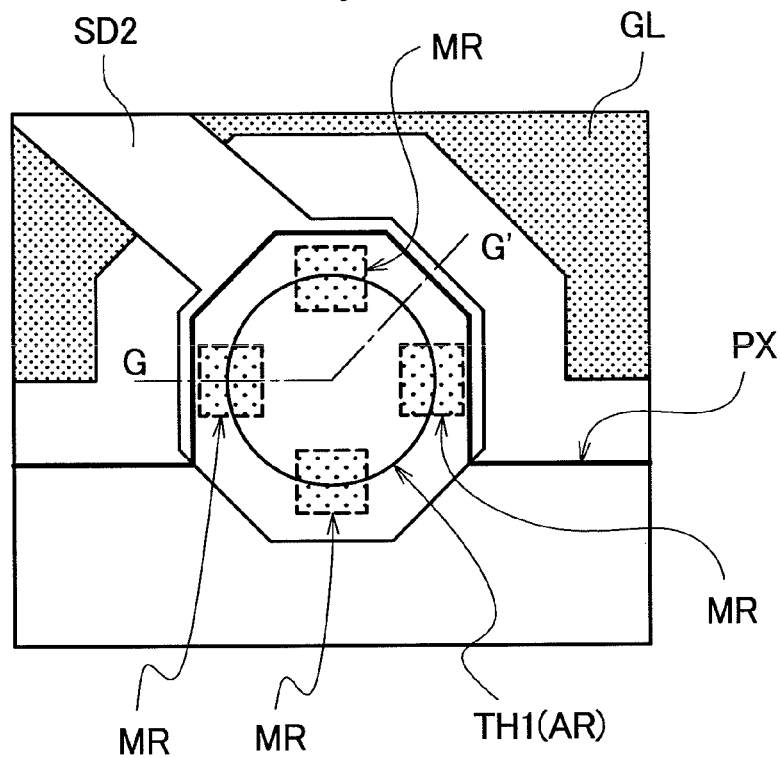
FIG. 16 is a schematic plan view for explaining a fourth modification of the through hole in the embodiment 1.

FIG. 14 is a schematic plan view for explaining a third modification of the through hole in the embodiment 1. FIG. 15 is a schematic cross-section al view taken along a line G-G' in FIG. 14. FIG. 16 is a schematic plan view for explaining a fourth modification of the through hole in the embodiment 1.

In forming the portion where the distance from the surface of the glass substrate SUB changes from d1 to d2 on the outer periphery AR of the opening end of through hole TH1 formed in the second insulation layer PAS2 remote from the glass substrate SUB, for example, island-like stepped-portion forming layers MR shown in FIG. 14 may be provided. Also in this case, by allowing the outer periphery AR of the opening end of the through hole TH1 formed in the second insulation layer PAS2 remote from the glass substrate SUB to pass through a region where the stepped-portion forming layer MR is interposed and a region where the stepped-portion forming layer MR is not interposed, as shown in FIG. 15, on the outer periphery AR of the opening end of the through hole TH1 formed in the second insulation layer PAS2 remote from the glass substrate SUB, a region in which the distance from the surface of the glass substrate SUB is d1 and a region in which the distance from the surface of the glass substrate SUB is d2 exist. Accordingly, in the same manner as the example shown in FIG. 6 and FIG. 7, a resist material or a resin material in a liquid form can easily enter the recessed portion formed in the through hole portion.

Further, in the modification shown in FIG. 14, the example in which two island-like stepped-portion forming layers MR are formed is exemplified. However, it is needless to say that the present invention is not limited to such an example and, for example, four island-like stepped-portion forming layers MR may be provided as shown in FIG. 16.

Figure 17:
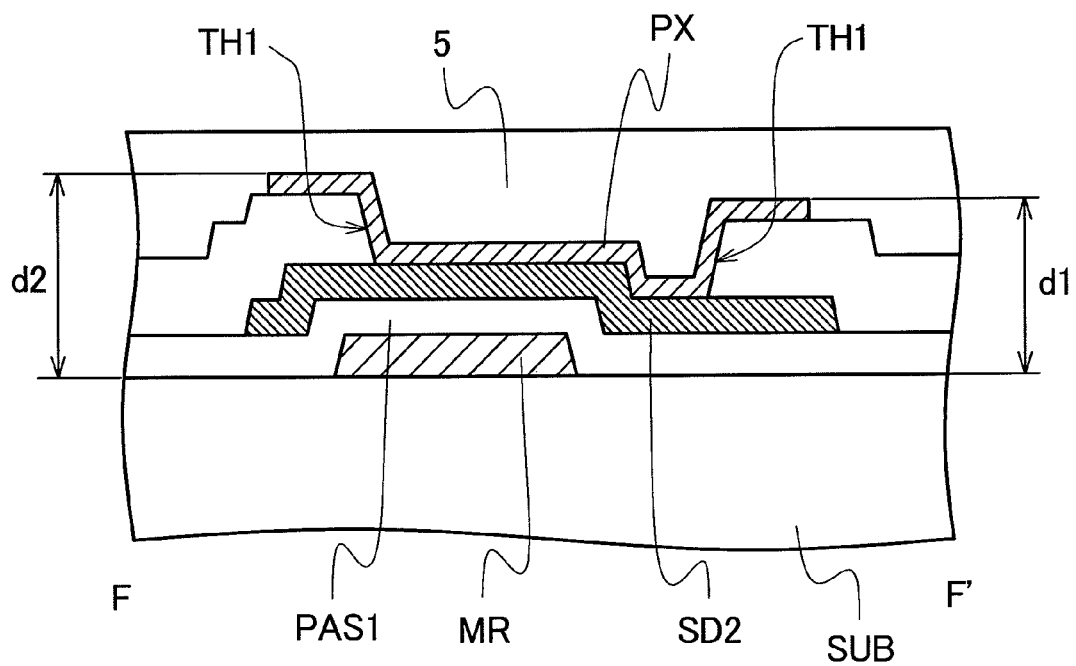
FIG. 17 is a schematic cross-section al view for explaining an application example of the through hole in the embodiment 1.

FIG. 17 is a schematic cross-section al view for explaining an application example of the through hole in the embodiment 1. Here, FIG. 17 is a cross-section al view corresponding to a cross section taken along a line D-D' in FIG. 6.

In the TFT substrate of the embodiment 1, to form the portion where the distance from the surface of the glass substrate SUB changes from d1 to d2 on the outer periphery AR of the opening end of the through hole TH1 formed in the second insulation layer PAS2 remote from the glass substrate SUB, for example, as shown in FIG. 7, the stepped-portion forming layer MR is provided between the source electrode SD2 and the first insulation layer PAS1. However, the formation of the stepped-portion forming layer MR is not limited to such an example and, for example, as shown in FIG. 17, the stepped-portion forming layer MR may be provided between the first insulation layer PAS1 and the glass substrate SUB. In this case, the stepped-portion forming layer MR may be simultaneously formed in a step which forms the scanning signal lines GL, for example. Further, in case of the TFT substrate in which one pixel adopts the constitution shown in FIG. 3 to FIG. 5, for example, there may be a case that a conductive film (ITO film) for forming the counter electrodes CT and a conductive film (Al film) for forming the scanning signal lines GL and the like are collectively formed. In such a case, the stepped-portion forming layer MR may be constituted by stacking the ITO film and the Al film.

Also in this case, by forming the through hole TH1 in the second insulation layer PAS2 such that the outer periphery AR of the opening end remote from the glass substrate SUB passes a region where the stepped-portion forming layer MR is provided and the region where the stepped-portion forming layer MR is not provided, on the outer periphery AR of the opening end of the through hole TH1 remote from the glass substrate SUB, there exists the portion in which the distance from the surface of the glass substrate SUB changes from d1 to d3 exists during one turn of the outer periphery AR. Accordingly, in the same manner as the example shown in FIG. 6 and FIG. 7, a resist material or a resin material in a liquid form can easily enter the recessed portion formed in the through hole portion.

Embodiment 2

Figure 18:
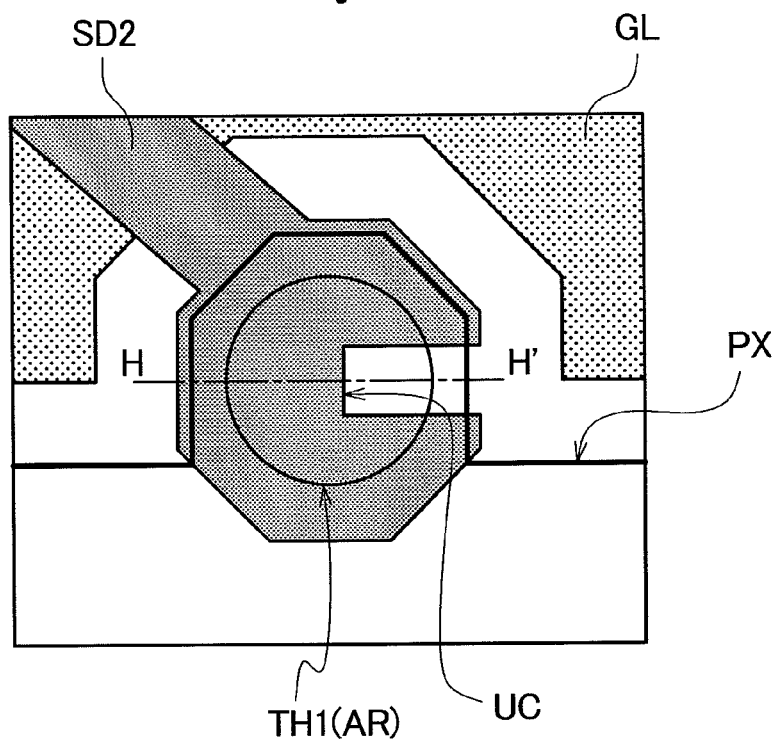
FIG. 18 is a schematic plan view showing the schematic constitution of the through hole in an embodiment 2.
Figure 19:
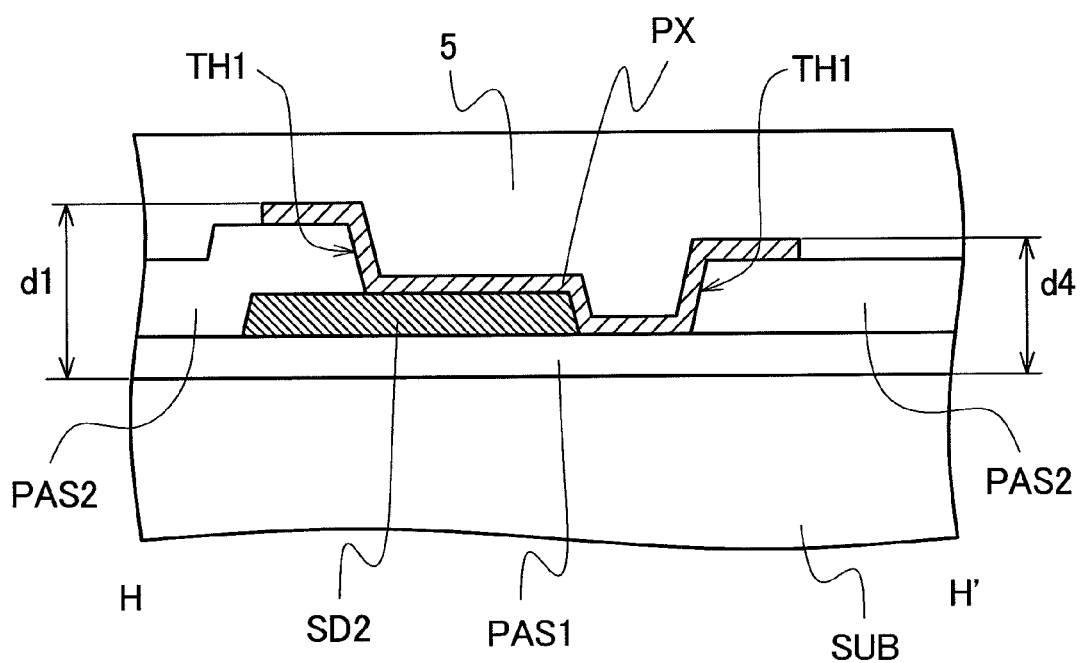
FIG. 19 is a schematic cross-section al view taken along a line H-H' in FIG. 18.

FIG. 18 and FIG. 19 are schematic views showing the schematic constitution of an essential part of a liquid crystal display panel of an embodiment 2 according to the present invention.

FIG. 18 is a schematic plan view showing the schematic constitution of a through hole in the embodiment 2. FIG. 19 is a schematic cross-section al view taken along a line H-H' in FIG. 18.

In the embodiment 1, by focusing on the through hole which connects the source electrode of the TFT element and the pixel electrode, as the constitution al example to which the present invention is applied, the case which provides the stepped-portion forming layer MR is exemplified. Further, by allowing the outer periphery AR of the opening end of the through hole (opening hole) TH1 formed in the second insulation layer PAS2 remote from the glass substrate SUB to pass through the region where the stepped-portion forming layer MR is provided and the region where the stepped-portion forming layer MR is not provided, the portion where the distance from the surface of the glass substrate SUB changes from d1 to d2 is formed on the outer periphery AR of the opening end of the through hole TH1 remote from the glass substrate SUB.

In the embodiment 2, the explanation is made with respect to a method for providing a portion where a distance from a surface of a glass substrate SUB changes on an outer periphery AR of an opening end of a through hole TH1 remote from the glass substrate SUB from a viewpoint different from the viewpoint of the embodiment 1.

As the method for forming the portion where the distance from a surface of a glass substrate SUB changes from d1 to d2 on the outer periphery AR of the opening end of the through hole TH1 remote from the glass substrate SUB without forming the stepped-portion forming layer MR, for example, as shown in FIG. 18, there exists a method which forms a cutout portion UC in a region of a source electrode SD2 where a pixel electrode PX is overlapped with the source electrode SD2 in plane.

Here, the cutout portion UC of the source electrode SD2 is formed such that the outer periphery AR of the through hole TH1 formed in the second insulation layer PAS2 remote from the glass substrate SUB intersects an outer periphery of the source electrode SD2 at the cutout portion UC. Due to such a constitution, the outer periphery AR of the opening end of the through hole TH1 formed in the second insulation layer PAS2 remote from the glass substrate SUB passes through a region where the source electrode SD2 is formed and a region where the source electrode SD2 is not formed. Accordingly, on the outer periphery AR of the opening end of the through hole TH1 remote from the glass substrate SUB, the portion where the distance from the surface of the glass substrate SUB changes from d1 to d4 exists during one turn of the outer periphery AR.

In this manner, by forming the portion where the distance from the surface of the glass substrate SUB changes from d1 to d4 on the outer periphery AR of the opening end of the through hole TH1 remote from the glass substrate SUB, in the same manner as the case in which the stepped-portion forming layer MR exemplified in the embodiment 1 is formed, at the portion where the distance from the surface of the glass substrate SUB changes on the outer periphery AR of the opening end of the through hole TH1 remote from the glass substrate SUB, a resist material or a resin material in a liquid form can easily enter a recessed portion formed in the through hole portion. Accordingly, it is possible to prevent a conductive failure between the source electrode SD2 and the pixel electrode PX and a defect of an orientation film.

Here, the cutout portion UC of the source electrode SD2 may be configured such that the outer periphery AR of the opening end of the through hole TH1 formed in the second insulation layer PAS2 remote from the glass substrate SUB intersects an outer periphery of the source electrode SD2 in the cutout portion UC. Accordingly, it is needless to say that a shape of the source electrode SD2 in a plan view is not limited to the shape shown in FIG. 18 and various shapes are applicable as a planar shape of the source electrode SD2.

Embodiment 3

Figure 20:
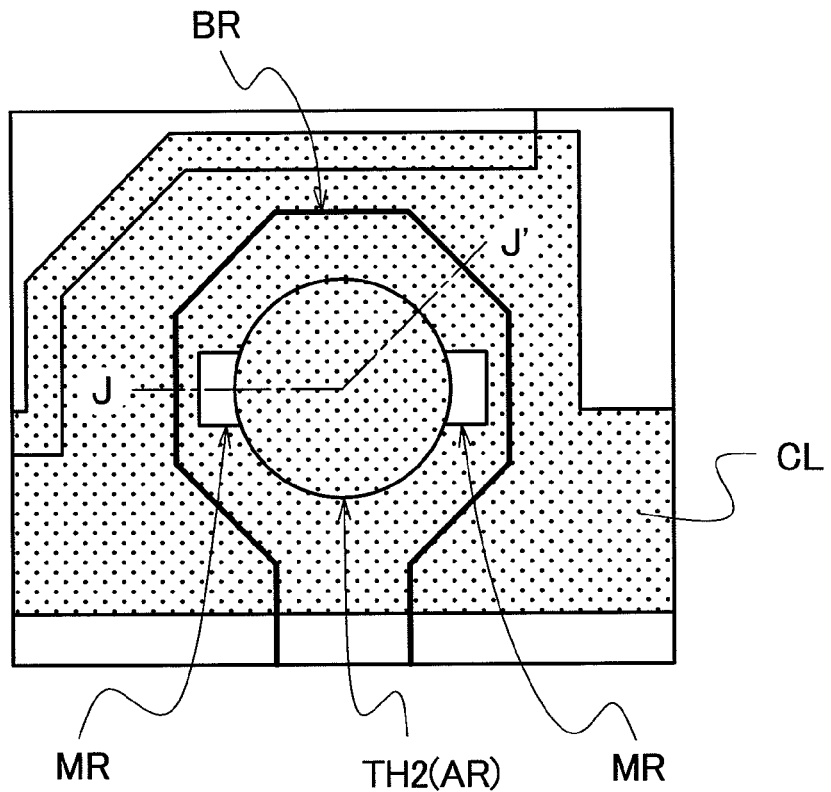
FIG. 20 is a schematic plan view showing the schematic constitution of the through hole in an embodiment 3.
Figure 21:
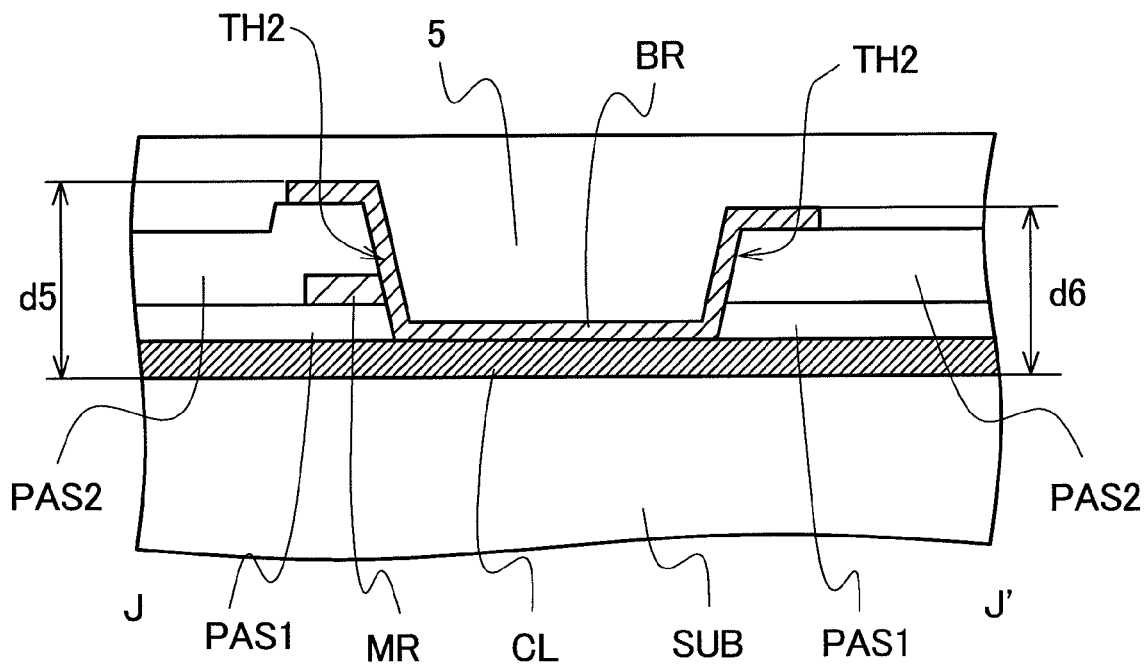
FIG. 21 is a schematic cross-section al view taken along a line J-J' in FIG. 20.

FIG. 20 and FIG. 21 are schematic views showing the schematic constitution of an essential part of a liquid crystal display panel of an embodiment 3 according to the present invention.

FIG. 20 is a schematic plan view showing the schematic constitution of a through hole in the embodiment 3. FIG. 21 is a schematic cross-section al view taken along a line J-J' in FIG. 20.

In the embodiment 1 and the embodiment 2, as one example of the through hole formed in the TFT substrate 1 of the liquid crystal display panel, the through hole TH1 which connects the source electrode SD2 and the pixel electrode PX is exemplified. However, one pixel adopts the pixel constitution of the TFT substrate having the constitution shown in FIG. 3 to FIG. 5, besides the through hole TH1, the through hole TH2 which connects the bridge line BR and the common signal line CL and the like may be formed, for example.

The embodiment 3 focuses on the through hole TH2 which connects the bridge line BR and the common signal line CL, and a constitutional example and the manner of operation and advantageous effects of a liquid crystal display panel when the present invention is applied to the liquid crystal display panel of this embodiment 3 is explained.

Provided that one pixel of the display region DA adopts the pixel constitution shown in FIG. 3 to FIG. 5, for example, when the present invention is applied to a connection portion between the common signal line CL and the bridge line BR, the pixel constitution is configured as shown in FIG. 20 and FIG. 21. Here, in a region where the common signal line CL and the bridge line BR are overlapped with each other in plane, between the first insulation layer PAS1 and the second insulation layer PAS2, stepped-portion forming layers MR are partially formed. In the embodiment 3, the stepped-portion forming layers MR are simultaneously formed in a step for forming semiconductor layers such as channel layers SC of TFT elements. Further, the stepped-portion forming layers MR are exposed to an opening side surface of the through hole TH2, for example.

Here, the through hole TH1 is configured such that an outer periphery AR of an opening end of the through hole TH1 remote from a glass substrate SUB passes through a region where the stepped-portion forming layer MR is formed and a region where the stepped-portion forming layer MR is not formed. Accordingly, on the outer periphery AR of the opening end of the through hole TH2 remote from the glass substrate SUB, a portion where a distance from the surface of the glass substrate SUB changes from d5 to d6 exists during one turn of the outer periphery AR.

In this manner, by forming the portion where the distance from the surface of the glass substrate SUB changes from d5 to d6 on the outer periphery AR of the opening end of the through hole TH2 remote from the glass substrate SUB, in the same manner as the case in which the stepped-portion forming layer MR exemplified in the embodiment 1 is formed, at the portion where the distance from the surface of the glass substrate SUB changes on the outer periphery AR of the opening end of the through hole TH2 remote from the glass substrate SUB, a resist material or a resin material in a liquid form can easily enter a recessed portion formed in the through hole portion. Accordingly, it is possible to prevent a conductive failure between the common signal line CL and the bridge line BR and a defect of an orientation film.

Figure 22:
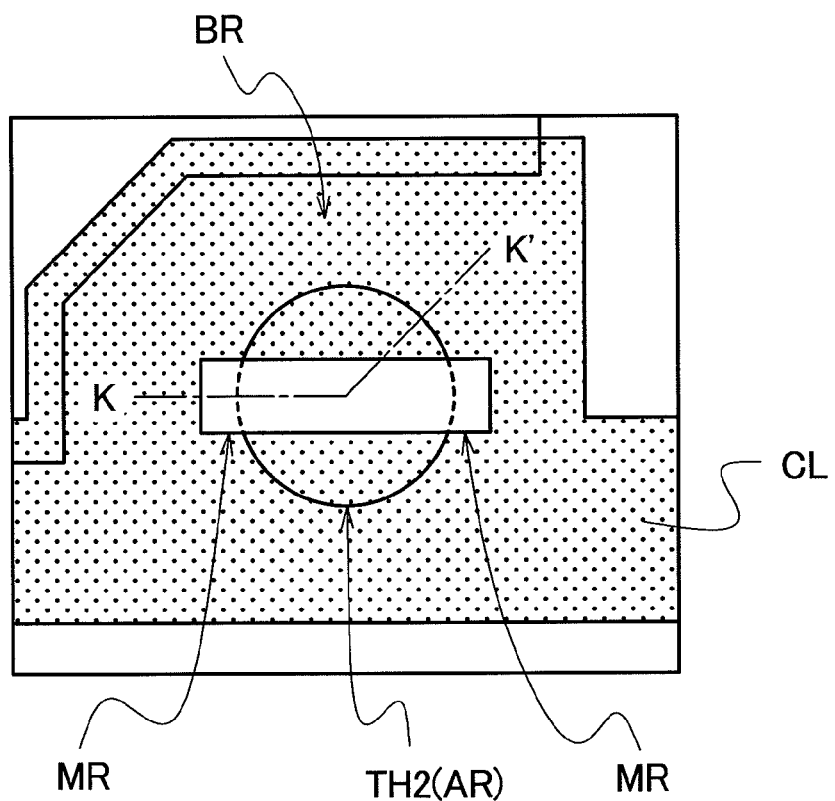
FIG. 22 is a schematic plan view showing a state of a glass substrate immediately before forming the through hole.
Figure 23:
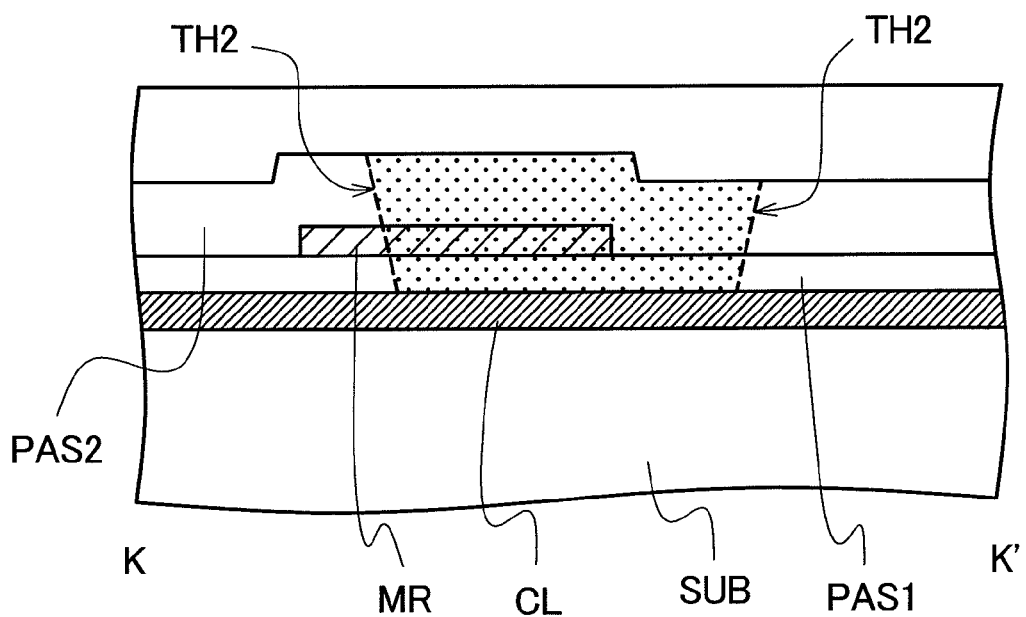
FIG. 23 is a schematic cross-section al view taken along a line K-K' in FIG. 22.

FIG. 22 and FIG. 23 are schematic views for explaining a manufacturing method of the through hole of the embodiment 3. FIG. 22 is a schematic plan view showing a state of the glass substrate immediately before forming the through hole. FIG. 23 is a schematic cross-sectional view taken along a line K-K' in FIG. 22.

In manufacturing the TFT substrate having the through hole TH2 of the constitution shown in the embodiment 3, a method and steps equal to conventional methods and steps may be adopted up to a step for forming the first insulation layer PAS1. Then, in forming the semiconductor layer such as the channel layer SC of the TFT element on the first insulation layer PAS1, for example, as shown in FIG. 22 and FIG. 23, the rod-like stepped-portion forming layer MR which is longer than a hole diameter of the outer periphery AR of the opening end of the through hole TH2 remote from the glass substrate SUB formed in a later step is simultaneously formed. Thereafter, the second insulation layer PAS2 is formed in the same manner as the conventional method. As a result, on the second insulation layer PAS2, as shown in FIG. 23, a stepped portion is formed in a boundary between the region where the stepped-portion forming layer MR is formed and the region where the stepped-portion forming layer MR is not formed.

Then, by forming the through hole TH2 in a state shown in FIG. 23, the stepped-portion forming layer MR disposed inside the outer periphery AR of the opening end of the through hole TH2 remote from the glass substrate SUB is removed, and the stepped-portion forming layer MR remaining outside the outer periphery AR of the opening end is exposed to the side surface of the through hole TH2. Thereafter, by forming the pixel electrode PX and the bridge line BR in the same manner as the conventional method, as shown in FIG. 21, it is possible to form the portion where the distance from the surface of the glass substrate SUB changes from d5 to d6 on the outer periphery AR of the opening end of the through hole TH2 remote from the glass substrate SUB.

Figure 24:
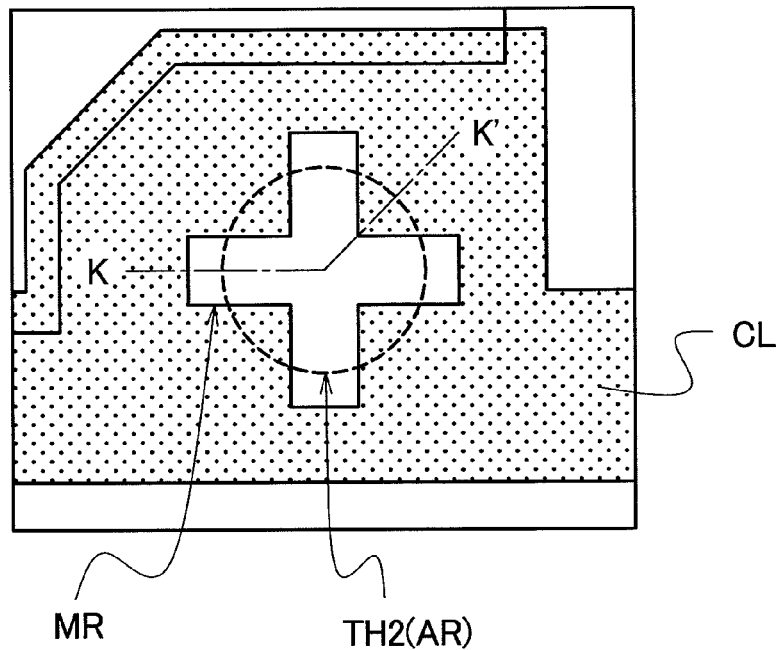
FIG. 24 is a schematic plan view for explaining a modification of a stepped-portion forming layer MR.

FIG. 24 is a schematic plan view for explaining a modification of the stepped-portion forming layer MR.

In manufacturing the TFT substrate 1 of the embodiment 3, due to the presence of the semiconductor layer, when the rod-like stepped-portion forming layer MR is formed as shown in FIG. 22, for example, after the formation of the through hole TH2, the stepped-portion forming layer MR remains in two regions of the outer periphery AR of the opening end of the through hole TH2 remote from the glass substrate SUB. However, it is needless to say that in forming the stepped-portion forming layer MR by the method used in the embodiment 3, a profile in a plan view of the stepped-portion forming layer MR formed by the semiconductor layer is not limited to the rod-shape and, for example, the profile may be formed in a cruciform as shown in FIG. 24. In this case, when the through hole TH2 is formed, the stepped-portion forming layers MR remain in four region on the outer periphery AR of the opening end of the through hole TH2 remote from the glass substrate SUB.

Here, although the explanation using drawings is omitted, by forming the through hole TH3 formed in the connecting portion of the bridge line BR and the common connection pad CP shown in FIG. 3 into a shape (constitution) shown in FIG. 20 and FIG. 21, it is possible to prevent a conductive failure between the common connection pad CP and the bridge line BR and a defect of an orientation film.

Embodiment 4

Figure 25:
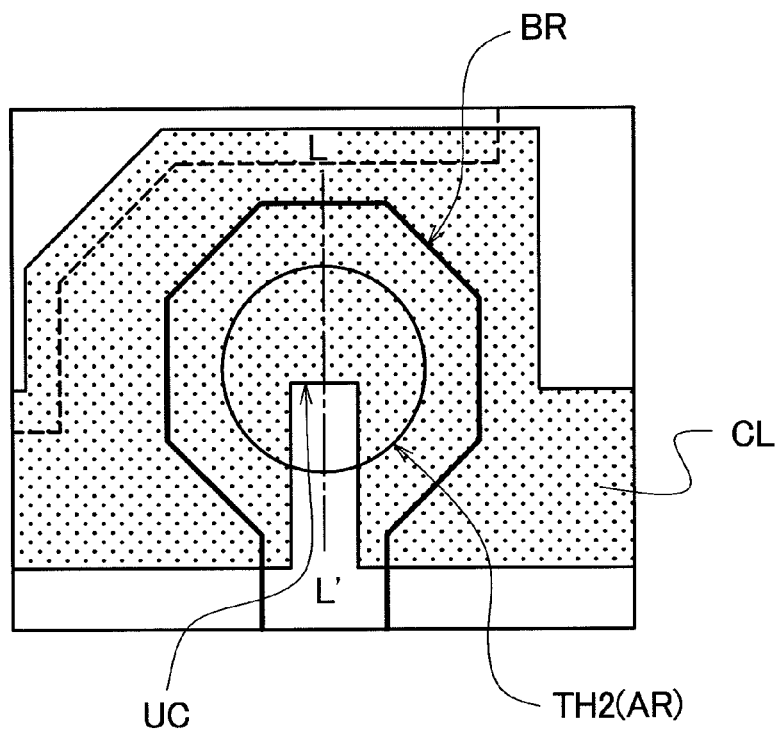
FIG. 25 is a schematic plan view showing the schematic constitution of the through hole in an embodiment 4.
Figure 26:
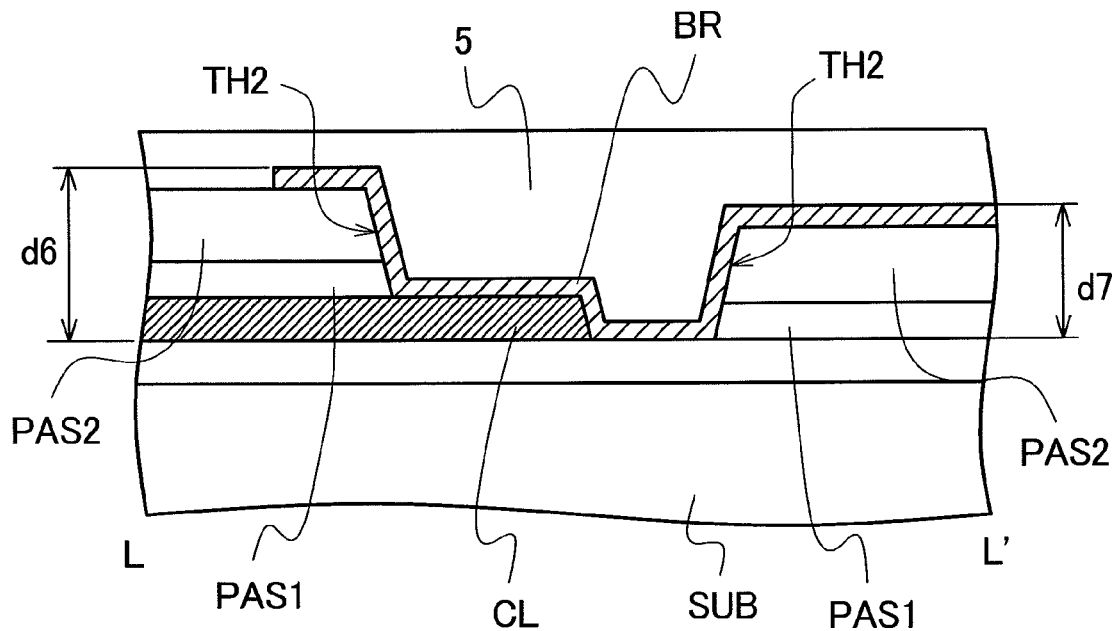
FIG. 26 is a schematic cross-section al view taken along a line L-L' in FIG. 25.

FIG. 25 and FIG. 26 are schematic views showing the schematic constitution of an essential part of a liquid crystal display panel of an embodiment 4 according to the present invention. FIG. 25 is a schematic plan view showing the schematic constitution of the through hole in the embodiment 4. FIG. 26 is a schematic cross-sectional view taken along a line L-L' in FIG. 25.

In the embodiment 3, by focusing on the through hole TH2 which connects the common signal line CL and the bridge line BR, as the constitutional example to which the present invention is applied, the case which provides the stepped-portion forming layer MR is exemplified. Further, by allowing the outer periphery AR of the opening end of the through hole TH2 remote from the glass substrate SUB to pass through the region where the stepped-portion forming layer MR is provided and the region where the stepped-portion forming layer MR is not provided, the portion where the distance from the surface of the glass substrate SUB changes from d5 to d6 is formed on the outer periphery AR of the opening end of the through hole TH2 remote from the glass substrate SUB.

In the embodiment 4, the explanation is made with respect to a method which forms a portion where a distance from a surface of a glass substrate SUB changes on an outer periphery AR of an opening end of a through hole TH2 remote from the glass substrate SUB from a viewpoint different from the viewpoint of the embodiment 3.

As the method for forming the portion where the distance from the surface of the glass substrate SUB changes on the outer periphery AR of the opening end of the through hole TH2 remote from the glass substrate SUB without forming the stepped-portion forming layer MR, for example, as shown in FIG. 25, there exists a method which forms a cutout portion UC in a region of a common signal line CL where a bridge line BR is overlapped with the common signal line CL.

Here, the cutout portion UC of the common signal line CL is formed such that the outer periphery AR of the through hole TH2 remote from the glass substrate SUB intersects an outer periphery of the common signal line CL at the cutout portion UC. Due to such a constitution, the outer periphery AR of the opening end of the through hole TH2 formed in the first insulation layer PAS1 and the second insulation layer PAS2 remote from the glass substrate SUB passes through a region where the common signal line CL is formed and a region where the common signal line CL is not formed. Accordingly, on the outer periphery AR of the opening end of the through hole TH2 remote from the glass substrate SUB, as shown in FIG. 26, the portion where the distance from the surface of the glass substrate SUB changes from d6 to d7 exists during one turn of the outer periphery AR.

In this manner, by forming the portion where the distance from the surface of the glass substrate SUB changes from d6 to d7 on the outer periphery AR of the opening end of the through hole TH2 remote from the glass substrate SUB, in the same manner as the case in which the stepped-portion forming layer MR exemplified in the embodiment 3 is formed, at the portion where the distance from the surface of the glass substrate SUB changes on the outer periphery AR of the opening end of the through hole TH2 remote from the glass substrate SUB, a resist material or a resin material in a liquid form can easily enter a recessed portion formed in the through hole portion. Accordingly, it is possible to prevent a conductive failure between the common signal line CL and the bridge line BR and a defect of an orientation film.

Here, the cutout portion UC of the common signal line CL may be configured such that the outer periphery AR of the opening end of the through hole TH2 remote from the glass substrate SUB intersects an outer periphery of the common signal line CL in the cutout portion UC. Accordingly, it is needless to say that a shape of the cutout portion UC in a plan view is not limited to the shape shown in FIG. 25 and various shapes are applicable as a planar shape of the cutout portion UC.

Figure 27:
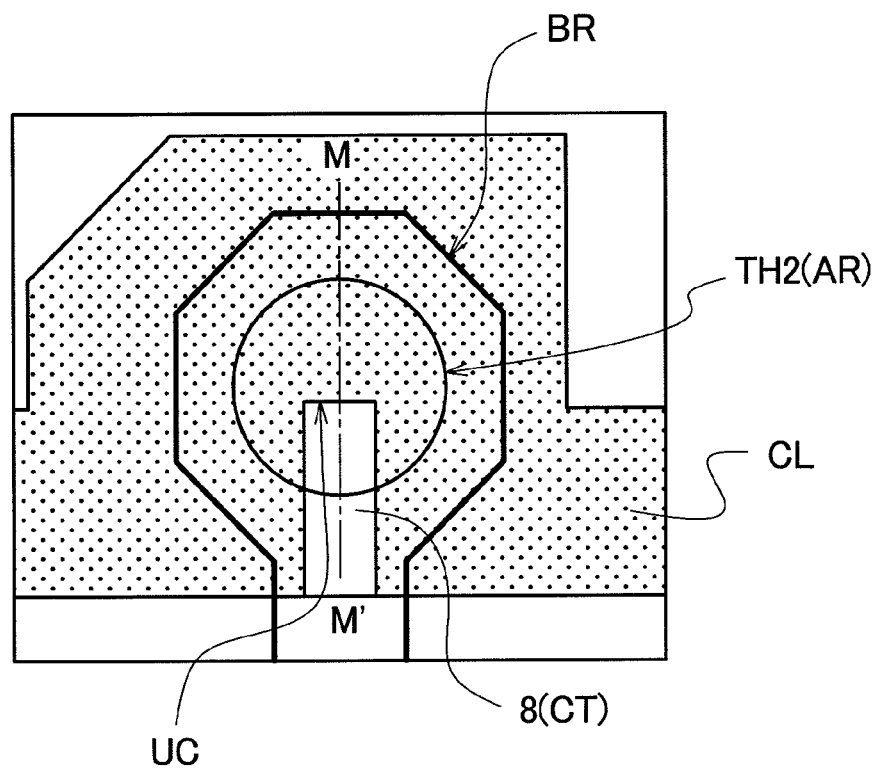
FIG. 27 is a schematic plan view for explaining a first modification of a connection portion of the through hole in the embodiment 4.
Figure 28:
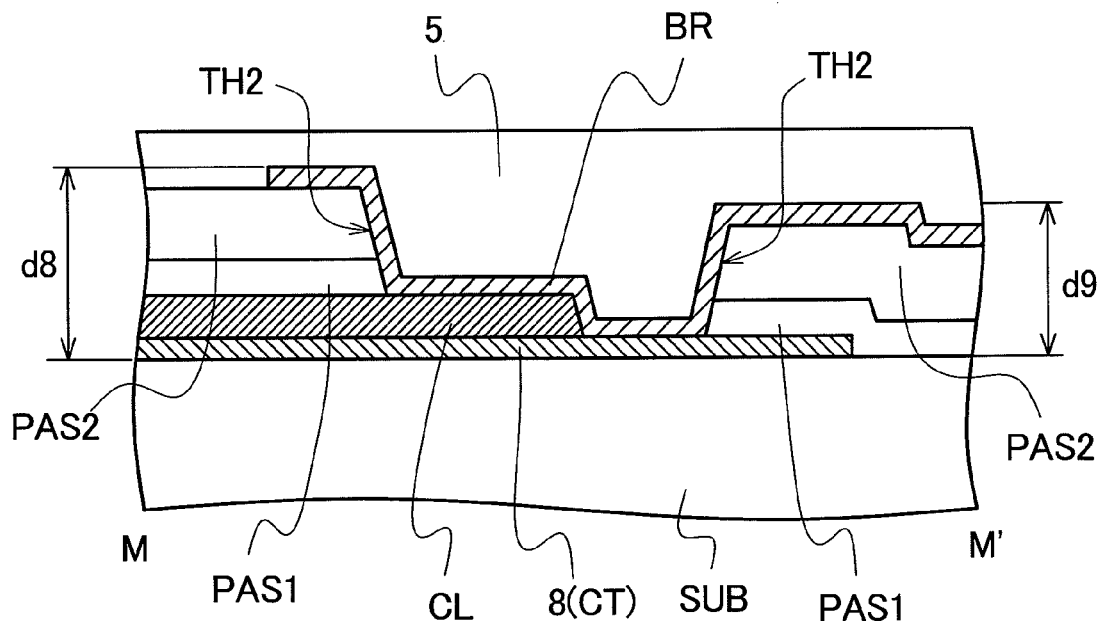
FIG. 28 is a cross-section al view taken along a line M-M' in FIG. 29.

FIG. 27 is a schematic plan view for explaining a first modification of the through hole in the embodiment 4. FIG. 28 is a cross-section al view taken along a line M-M' in FIG. 29. FIG. 30 is a schematic plan view for explaining a second modification of the through hole in the embodiment 4.

The TFT substrate 1 of the embodiment 4 is configured such that one pixel adopts the constitution shown in FIG. 3 to FIG. 5. Here, there may be a case that counter electrodes CT, scanning signal lines GL, common signal lines CL and common connection pads CP which are formed on the surface of the glass substrate SUB are collectively formed. In this case, on the surface of the glass substrate SUB, for example, an ITO film for forming the counter electrode CT and conductive films such as an aluminum film for forming the scanning signal lines GL are stacked and, thereafter, the conductive film is etched to form the scanning signal lines GL and the like. Subsequently, the ITO film is etched to form the counter electrode CT. Accordingly, with respect to the scanning signal lines GL or the common signal lines CL, there may be a case that the ITO film remains below the conductive film such as the aluminum film. That is, there may be a case that the ITO film remains between the conductive film and the glass substrate SUB.

In steps for forming the TFT substrate 1 in the embodiment 4, in forming the cutout portion UC in the common signal line CL, for example, the conductive film formed of an aluminum film and the ITO film may be removed. However, as shown in FIG. 27 and FIG. 28, it is preferable to form the cutout portion UC by removing the conductive film formed of an aluminum film, while leaving an ITO film 8. Due to such a constitution, when the through hole TH2 is formed in the first insulation layer PAS1 and the second insulation layer PAS2, the remaining ITO film 8 functions as a protective film thus preventing the glass substrate SUB from being shaved off.

Figure 29:
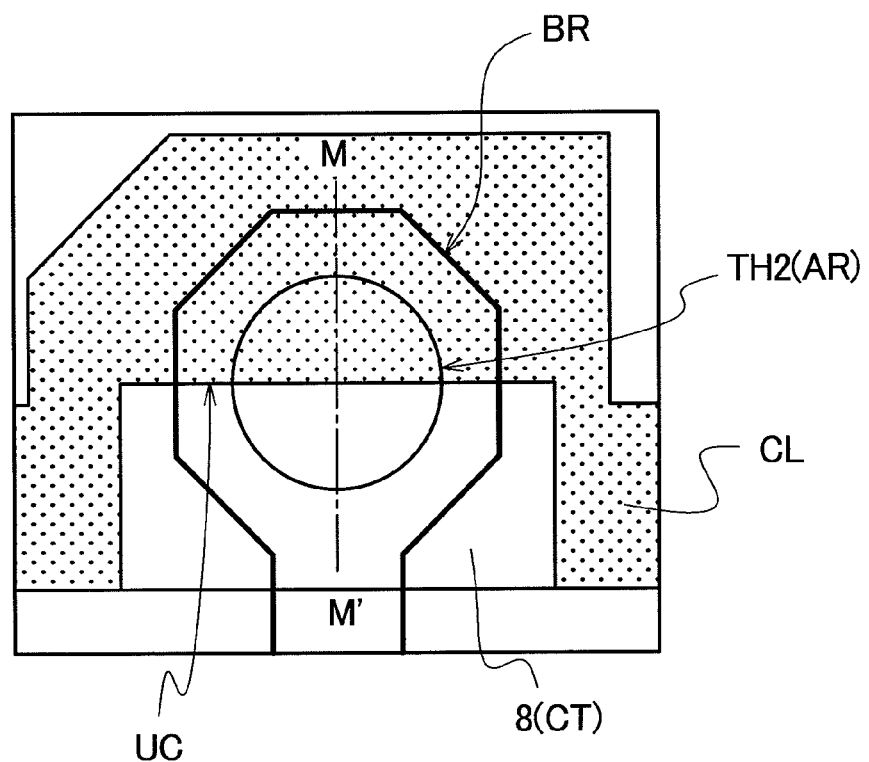
FIG. 29 is a schematic plan view for explaining a second modification of the through hole in the embodiment 4.
Figure 30:
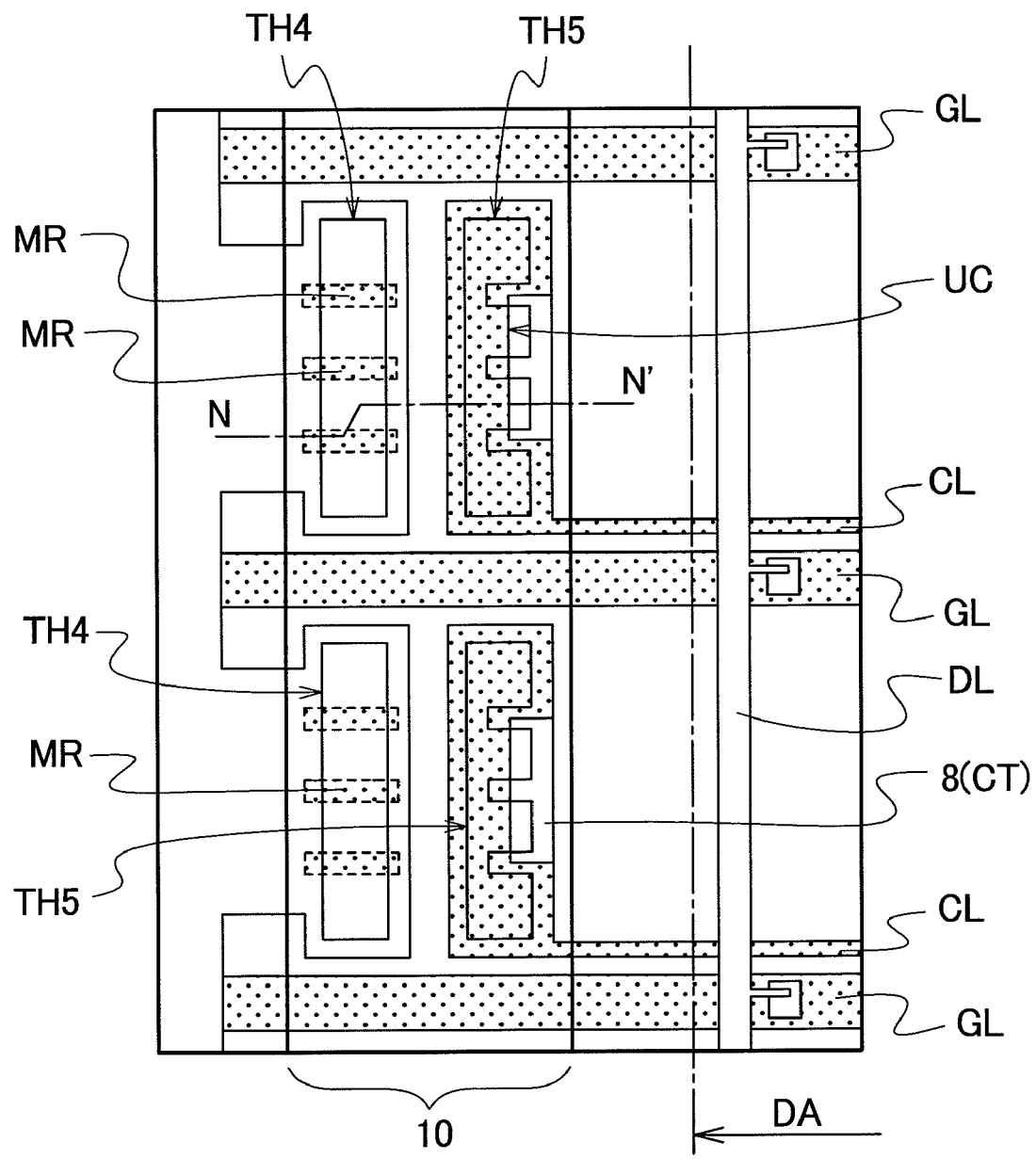
FIG. 30 is a schematic plan view showing the schematic constitution of the through hole in an embodiment 5.

Further, in forming the cutout portion UC in the common signal line CL, for example, as shown in FIG. 29, it is desirable to form the cutout portion UC such that the cutout portion UC divides the through hole TH2 in two.

Here, the cutout portion UC of the common signal line CL may be configured such that the outer periphery AR of the opening end of the through hole TH2 remote from the glass substrate SUB intersects the outer periphery of the common signal line CL in the cutout portion UC. Accordingly, it is needless to say that a shape of the cutout portion UC in a plan view is not limited to the shape shown in FIG. 29 and FIG. 31 and various shapes are applicable as a planar shape of the cutout portion UC.

Further, although the explanation using drawings is omitted, by forming the through hole TH3 which connects the bridge line BR and the common connection pad CP into a shape (constitution) shown in FIG. 27 and FIG. 28, it is possible to prevent a conductive failure between the common signal line CL and the bridge line BR and a defect of an orientation film.

Embodiment 5

Figure 31:
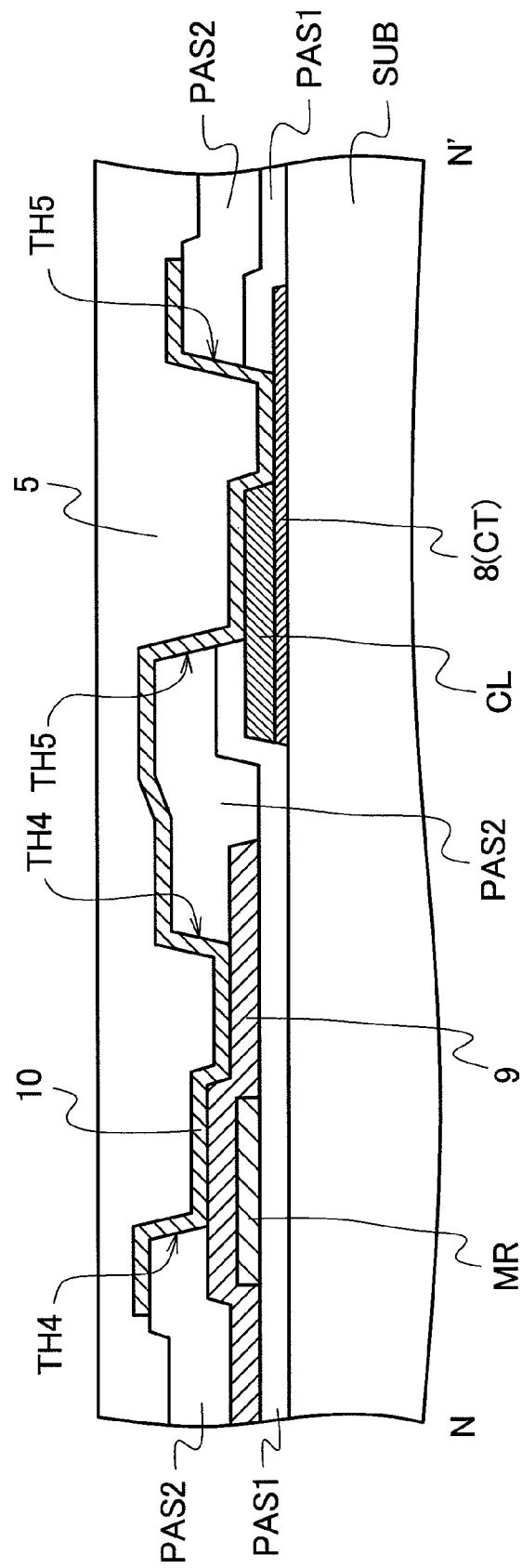
FIG. 31 is a schematic cross-section al view taken along a line N-N' in FIG. 30.

FIG. 30 and FIG. 31 are schematic views showing the schematic constitution of an essential part of a liquid crystal display panel of an embodiment 5 according to the present invention.

FIG. 30 is a schematic plan view showing the schematic constitution of the through hole in the embodiment 5. FIG. 31 is a schematic cross-section al view taken along a line N-N' in FIG. 30.

The embodiment 1 to the embodiment 4 focus on the through hole formed in the pixel region of the display region DA of the liquid crystal display panel (TFT substrate 1), and the constitution al example to which the present invention is applied is explained.

However, there may be a case in which the through hole is formed outside the display region DA on the TFT substrate 1. In the embodiment 5, a constitution al example in which the present invention is applied to the through hole formed outside the display region DA is explained.

In the case in which the TFT substrate 1 adopts the constitution shown in FIG. 3 to FIG. 5, for example, as shown in FIG. 30 and FIG. 31, the common bus line 9 which electrically connects the plurality of common signal lines CL is provided outside the display region DA, and the common bus line 9 and the respective common signal lines CL are connected with each other via the through holes TH4, TH5 using the common line 10.

Here, the common bus lines 9 are, for example, formed simultaneously in a step in which the video signal lines DL or the like are formed. Further, the common lines 10 are formed simultaneously in the step in which the pixel electrodes PX are formed.

Further, in a region where the through hole TH4 which connects the common bus line 9 and the common line 10 with each other is formed, the stepped-portion forming layer MR explained in the embodiment 1 is formed, and the outer periphery of the opening end of through hole TH4 remote from the glass substrate SUB passes through the region where the stepped-portion forming layer MR is interposed and the region where the stepped-portion forming layer MR is not interposed during one turn of the outer periphery. Here, the stepped-portion forming layers MR are simultaneously formed in a step in which the semiconductor layers such as channel layers SC of the TFT elements are formed. Due to such a constitution, at a portion where a distance from the surface of the glass substrate SUB changes formed on the outer periphery of the opening end of the through hole TH4 remote from the glass substrate SUB, the resist material or the resin material in a liquid form can easily enter the recessed portion formed in the through hole portion. Accordingly, it is possible to prevent a conductive failure between the common bus line 9 and the common line 10 and a defect of an orientation film.

Further, in a region where the through hole TH5 which connects the common signal line CL and the common line 10 with each other is formed, as explained in the embodiment 4, the cutout portion UC is formed in the common signal line CL, and the outer periphery of the opening end of through hole TH5 remote from the glass substrate SUB passes through a region where the common signal line CL is interposed and a region where the common signal line CL is not interposed during one turn of the outer periphery. Due to such a constitution, at a portion where a distance from the surface of the glass substrate SUB changes formed on the outer periphery of the opening end of the through hole TH5 remote from the glass substrate SUB, the resist material or the resin material in a liquid form can easily enter the recessed portion formed in the through hole portion. Accordingly, it is possible to prevent a conductive failure between the common signal line CL and the common line 10 and a defect of an orientation film.

Here, in the region where the through hole TH5 which connects the common signal line CL and the common line 10 with each other is formed, for example, as shown in FIG. 31, it is desirable that the ITO film 8 is interposed between the common signal line CL and the glass substrate SUB and the cutout portion UC of the common signal line CL is formed of only the conductive film which is used for forming the scanning signal line GL and the like. Due to such a constitution, when the through hole TH5 is formed in the first insulation layer PAS1 and the second insulation layer PAS2, the remaining ITO film 8 functions as a protective film thus preventing the glass substrate SUB from being shaved off in the cutout portion UC.

FIG. 32 is a schematic cross-section al view for explaining a modification of the through hole in the embodiment 5. Here, FIG. 32 is a cross-section al view corresponding to a cross section taken along a line N-N' in FIG. 30.

In the region where the through hole TH5 which connects the common signal line CL and the common line 10 with each other is formed on the TFT substrate 1 of the embodiment 5, for example, as shown in FIG. 31, it is desirable that the ITO film 8 is interposed between the common signal line CL and the glass substrate SUB. However, it is needless to say that the present invention is not limited to such a constitution and, for example, as shown in FIG. 32, the ITO film 8 may not be interposed between the common signal line CL and the glass substrate SUB.

Further, in the embodiment 5, the TFT substrate 1 in which one pixel of the display region DA adopts the constitution shown in FIG. 3 to FIG. 5 is exemplified. However, also with respect to a substrate TFT in which one pixel of the display region DA adopts the constitution other than the above-mentioned constitution, holding capacitive lines may be arranged in parallel to the respective scanning signal lines GL and, the respective holding capacitive lines may be connected with each other using the common line 10 outside the display region DA. In this case, the common electrode CT is formed on another layer or on the counter substrate and hence, the TFT substrate may be, as shown in FIG. 32, configured such that the ITO film 8 is not interposed between the holding capacitive line and the glass substrate SUB.

Here, in the embodiment 5, in a region where the through hole TH4 which connects the common bus line 9 and the common line 10 with each other is formed, the stepped-portion forming layer MR which is constituted of the semiconductor layer and is simultaneously formed with the semiconductor layer such as the channel layer SC of the TFT element is formed. However, it is needless to say that the stepped-portion forming layer MR is not limited to such a constitution, and the stepped-portion forming layer MR may be simultaneously formed with the scanning signal lines GL. Further, it is needless to say that instead of forming the stepped-portion forming layer MR, the cutout portion UC may be formed in the common bus line 9, for example.

Further, also with respect to the region where the through hole TH5 which connects the common signal line CL and the common line 10 with each other is formed, it is needless to say that instead of forming the cutout portion UC, for example, the stepped-portion forming layer MR such as the channel layer SC of the TFT element explained in conjunction with the embodiment 3 which is constituted of the semiconductor layer and is simultaneously formed with the semiconductor layer may be formed.

Although the present invention has been specifically explained in conjunction with the embodiment heretofore, it is needless to say that the present invention is not limited to the above-mentioned embodiment and various modifications are conceivable without departing from the gist of the present invention.

For example, in the embodiment 1 to the embodiment 5, the case in which one pixel adopts the constitution shown in FIG. 3 to FIG. 5 has been explained. However, it is needless to say that the present invention is not limited to such a constitution, and the present invention is applicable to a through hole which connects two conductive layers on a TFT substrate having the convention ally known various constitutions.

Further, the embodiment 1 to the embodiment 5 have been explained by taking the TFT substrate used in the liquid crystal display panel as an example. However, the present invention is not limited to such an example, and it is needless to say that the present invention is applicable to a through hole which connects two conductive layers in a display panel including a substrate which has the substantially equal constitution as the TFT substrate used in the liquid crystal display panel. That is, the present invention is not limited to the liquid crystal display panel, and is also applicable to a self-luminescent type display panel using a PDP (Plasma Display Panel) or an organic EL (Electro Luminescence) display panel, for example.

What is claimed is:

1. A display device comprising:
a pair of substrates which is formed of a transparent member;
a first conductive layer which is formed on one of the substrates;
a second conductive layer which is formed on a liquid crystal side of the first conductive layer by way of an intermediate layer which includes at least one insulation layer; and
an opening portion formed in the intermediate layer, wherein
out of opening ends of the opening portion, an outer periphery of the opening end on the liquid crystal side has a distance thereof from the substrate changed one time or more during one turn of the outer periphery.

2. A display device according to claim 1, wherein the first conductive layer and the second conductive layer are electrically connected with each other via the opening portion.

3. A display device comprising:
a pair of substrates which is adhered to each other by way of liquid crystal;
a first conductive layer which is formed on one of the substrates;
a second conductive layer which is formed on a liquid crystal layer side of the first conductive layer by way of an intermediate layer which includes at least one insulation layer, and
an opening portion formed in the intermediate layer such that the first conductive layer is exposed, wherein
the second conductive layer is at least overlapped with the opening portion and formed to be electrically connected with the first conductive layer at a bottom of the opening portion, and
a stepped-portion forming layer is formed at least at a position between one portion of an opening end of the opening portion and the one of the substrates so that the bottom of the opening portion is formed with at least one step therein.

4. A display device according to claim 3, wherein the stepped-portion forming layer is formed between the second conductive layer and the substrate.

5. A display device according to claim 4, wherein the stepped-portion forming layer is formed in a semicircular shape and a portion of the stepped-portion forming layer is overlapped with the one portion of the opening end.

6. A display device according to claim 4, wherein the stepped-portion forming layer is formed in a rectangular shape and a portion of the stepped-portion forming layer is overlapped with the one portion of the opening end.

7. A display device according to claim 4, wherein the stepped-portion forming layer is formed in a cruciform shape and a portion of the stepped-portion forming layer is overlapped with the one portion of the opening end.

8. A display device according to claim 4, wherein the stepped-portion forming layer is formed in a rectangular shape and a plurality of stepped-portion forming layers are arranged at positions where the stepped-portion forming layers are overlapped with the opening end.

9. A display device according to claim 3, wherein the intermediate layer is constituted of two insulation layers and the stepped-portion forming layer is interposed between the insulation layers and is formed at a position where the stepped-portion forming layer is brought into contact with a portion of the opening portion.

10. A display device according to claim 9, wherein a plurality of stepped-portion forming layers are formed in a periphery of the opening portion.

11. A display device according to claim 3, wherein the first conductive layer is connected with a switching element and the second conductive layer is a pixel electrode.

12. A display device according to claim 3, wherein the second conductive layer is a counter electrode, and the first conductive layer is a common line which is connected to a common signal line which supplies an electric signal to the counter electrode.

13. A display device according to claim 3, wherein the stepped-portion forming layer is formed at least at one position between the one portion of the opening end of the opening portion and the one of the substrates so that a distance from the one portion of the opening end of the opening portion to the one of the substrates is greater than a distance from another portion of the opening end of the opening portion to the one of the substrates without the stepped-portion forming layer therebetween.

* * * * *